United States Patent [19]

Kakuta et al.

[11] Patent Number: 5,099,369
[45] Date of Patent: Mar. 24, 1992

[54] MAGNETIC RECORDING AND REPRODUCING APPARATUS

[75] Inventors: Yoshinori Kakuta; Kunihiko Nakagawa; Seiji Kishikawa; Akira Sakuta; Masami Tomita; Nobuzumi Kurihara, all of Nagaokakyo, Japan

[73] Assignee: Mitsubishi Denki Kabushiki Kaisha, Tokyo, Japan

[21] Appl. No.: 523,571

[22] Filed: May 15, 1990

[30] Foreign Application Priority Data

| May 15, 1989 | [JP] | Japan | 1-121903 |
| May 15, 1989 | [JP] | Japan | 1-121907 |
| Oct. 12, 1989 | [JP] | Japan | 1-267023 |
| Dec. 13, 1989 | [JP] | Japan | 1-324525 |
| Jan. 12, 1990 | [JP] | Japan | 2-5172 |
| Jan. 19, 1990 | [JP] | Japan | 2-11494 |
| Jan. 19, 1990 | [JP] | Japan | 2-11495 |
| Mar. 8, 1990 | [JP] | Japan | 2-58401 |
| Apr. 20, 1990 | [JP] | Japan | 2-106013 |
| May 6, 1990 | [JP] | Japan | 2-26586 |

[51] Int. Cl.$^5$ ............................ G11B 15/665
[52] U.S. Cl. ............................ 360/85
[58] Field of Search ............................ 360/85

[56] References Cited

U.S. PATENT DOCUMENTS

| 4,780,775 | 10/1988 | Hirose et al. | 360/85 |
| 4,907,110 | 3/1990 | Ando | 360/85 |
| 4,912,578 | 3/1990 | Katohno et al. | 360/85 |

FOREIGN PATENT DOCUMENTS 62-36772  2/1987  Japan .
63-168870 7/1988  Japan .

Primary Examiner—Robert S. Tupper

[57] ABSTRACT

A magnetic recording and reproducing apparatus, such as VTR or DAT, in which a cassette containing a magnetic tape is to be loaded and which is capable of drawing the tape from the cassette and introducing onto a head drum to perform desired recording and reproducing actions. A tape loading mechanism of the apparatus comprises at least one loading disk, a tape drawing member, and a drive system for the drawing member. For minimizing the size of the apparatus, the loading disk is disposed around one of a pair of reel spindles, and the rotation of the loading disk is transmitted to the drawing member via a link. The loading mechanism gives the same driving force also to a tape tensioning device, a reel spindle braking device and a pinch roller driving device.

18 Claims, 29 Drawing Sheets

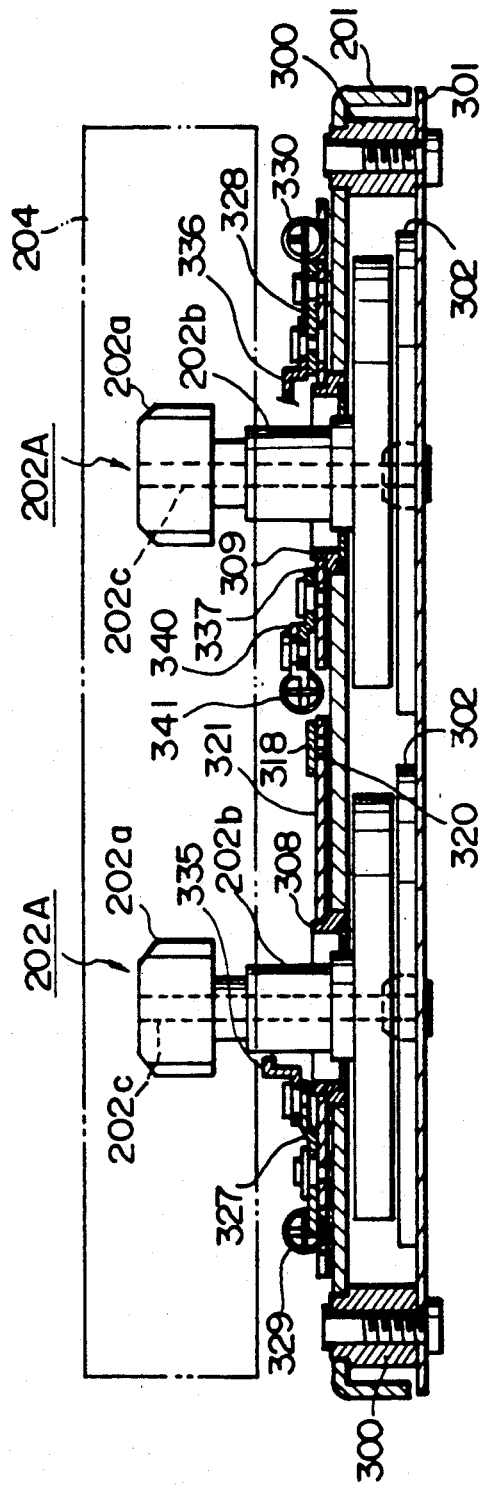
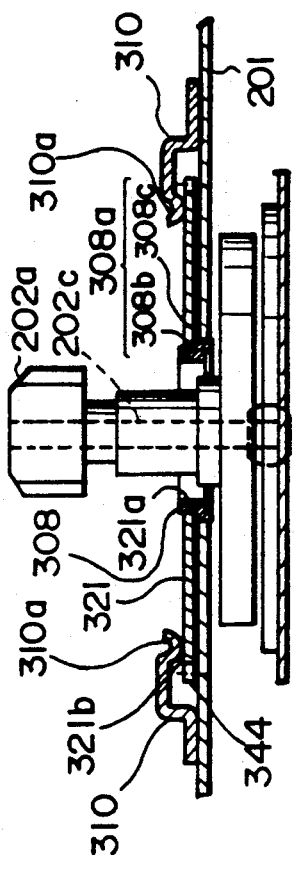
FIG. 20
FIG. 21

1

MAGNETIC RECORDING AND REPRODUCING APPARATUS

BACKGROUND OF THE INVENTION

1. Field of the Invention

This invention relates to a magnetic recording and reproducing apparatus, such as a VTR (video tape recorder) or a DAT (digital audio tape recorder), using a magnetic tape, and more particularly to a tape loading mechanism of the magnetic recording and reproducing apparatus.

2. Description of the Related Art

Heretofore, various magnetic recording and reproducing apparatuses have been realized in which necessary audio or video signals are magnetically recorded on a magnetic tape and are reproduced as the magnetically recorded data on the magnetic tape are read. In general, when a tape cassette containing the magnetic tape is loaded in the apparatus, the magnetic tape is wound on the head to perform a desired recording or reproducing action.

The magnetic tape contained in the cassette or cartridge as removed from the apparatus is virtually perfectly concealed within the cassette, without exposing to the outside, to prevent the data on the magnetic tape from being damaged or contaminated.

However, since the magnetic tape with the cassette loaded in the apparatus is drawn from the cassette and is wound on the head, a desired loading action is required.

To this end, various types of loading mechanisms has hitherto been proposed, for example, in Japanese Patent Laid-Open Publications Nos. 168870/1988, 248258/1986 and 36772/1987.

In any one of these prior loading mechanisms, a tape drawing member operates to draw the magnetic tape from the cassette and to introduce onto a magnetic head with the assistance of a cam means driven by a motor.

However, any one of the prior apparatus is complex in structure and large in size. Further, with the prior cam means, a large biasing force of the spring occasionally is applied to the drive means, causing mechanical wear, reducing the life of the apparatus sharply, and occasionally resulting in faults.

SUMMARY OF THE INVENTION

It is therefore an object of this invention to provide a magnetic recording and reproducing apparatus which can be reduced in thickness and hence in size.

Another object of the invention is to provide a loading mechanism which enables a reliable tape loading action and which can be assembled easily and neatly.

Still another object of the invention is to provide a magnetic recording and reproducing apparatus which is equipped with a pinch roller drive mechanism having a thin, small-sized driving means.

A further object of the invention is to provide a magnetic recording and reproducing apparatus equipped with a tension arm loading mechanism.

A still further object of the invention is to provide a magnetic recording and reproducing apparatus equipped with a tension arm loading mechanism which includes a tension arm for giving a needed tension to a magnetic tape during loading and in which the drive transmission system prior to the tension arm is simplified to reduce dimensional errors between parts, thus making the apparatus small in size and also in thickness.

An additional object of the invention is to provide a small-sized magnetic recording and reproducing apparatus which is equipped with a brake member for braking the reel spindles to stop the magnetic tape suddenly at a predetermined position and in which a braking action and a brake releasing action of a reel spindle braking device can be performed quickly during high-speed forward feeding and high-speed rewinding.

A still additional object of the invention is to a magnetic recording and reproducing apparatus equipped with a rotary magnetic head drum which includes a rotary magnetic head drum having a built-in magnetic head which can trace accurately on the track of the magnetic tape without inclining the plane of rotation of the magnetic head drum.

According to a first aspect of the invention, there is provided a magnetic recording and reproducing apparatus of the type in which a magnetic tape is to be drawn from a tape cassette and to be introduced onto a magnetic head drum to define a predetermined tape traveling path, the apparatus comprising: a pair of rotary reel spindles; at least one loading disk disposed around the rotary reel spindles without engagement therewith, the loading disk having a driven gear along its outer peripheral edge; a tape drawing member movable for drawing the magnetic tape from the tape cassette as guided by a guide groove in a chassis of the apparatus and then introducing the drawn magnetic tape onto the magnetic head drum; a link connected at opposite ends to the loading disk and the tape drawing member, respectively, for converting the rotation of the loading disk to the drawing movement of the tape drawing member; and driving means for giving a rotating force to the loading disk.

According to a second aspect of the invention, there is provided a magnetic recording and reproducing apparatus of the type in which a magnetic tape is to be drawn from a tape cassette and to be introduced onto a magnetic head drum to define a predetermined tape traveling path, the apparatus comprising: a pair of rotary reel spindles; at least one loading disk disposed around the rotary reel spindles without engagement therewith, the loading disk having a driven gear along its outer peripheral edge; a tape drawing member movable for drawing the magnetic tape from the tape cassette as guided by a guide groove in a chassis of the apparatus and then introducing the drawn magnetic tape onto the magnetic head drum; a link connected at opposite ends to the loading disk and the tape drawing member, respectively, for converting the rotation of the loading disk to the drawing movement of the tape drawing member, the link being fixedly positioned with respect to the loading disk in such a manner that when loading the magnetic tape, the direction of reaction acting on the loading disk is displaced beyond the center of the loading disk during loading and that the reaction acts in the direction of holding the loading disk in its loading position by the reaction from the tape drawing member; and driving means for giving a rotating force to the loading disk.

According to a third aspect of the invention, there is provided a magnetic recording and reproducing apparatus of the type in which a magnetic tape is to be drawn from a tape cassette and to be introduced onto a magnetic head drum to define a predetermined tape traveling path, the apparatus comprising: a pair of rotary reel spindles; at least a pair of loading disks disposed around the rotary reel spindles without engagement therewith, each of the loading disks having a driven gear along its outer peripheral edge; a tape drawing member movable for drawing the magnetic tape from the tape cassette as guided by a guide groove in a chassis of the apparatus and then introducing the drawn magnetic tape onto the magnetic head drum; first and second links each connected at opposite ends to a respective one of the loading disks and the tape drawing member, respectively, for converting the rotation of the respective loading disk to the drawing movement of the tape drawing member, the first link being connected to one of the loading disk for moving the tape drawing member, the second link being connected to the other loading disk for angularly moving a pinch arm; and driving means for giving a rotating force to the loading disk.

The above and other advantages, features and additional objects of this invention will be manifest to those versed in the art upon making reference to the following detailed description and the accompanying drawings in which several preferred structural embodiments incorporating the principles of this invention are shown by way of illustrative example.

BRIEF DESCRIPTION OF THE DRAWINGS

FIG. 20 is a vertical cross-sectional view showing the parts around a pair of reel spindles of FIG. 15;

FIG. 21 is a detailed cross-sectional view showing the parts around the reel spindles of the second embodiment, with a loading mechanism located concentrically of the reel spindle;

DETAILED DESCRIPTION

Loading Mechanism of the First Embodiment

A loading mechanism of the first embodiment of this invention will now be described in connection with FIGS. 1 through 11.

Figure 1:
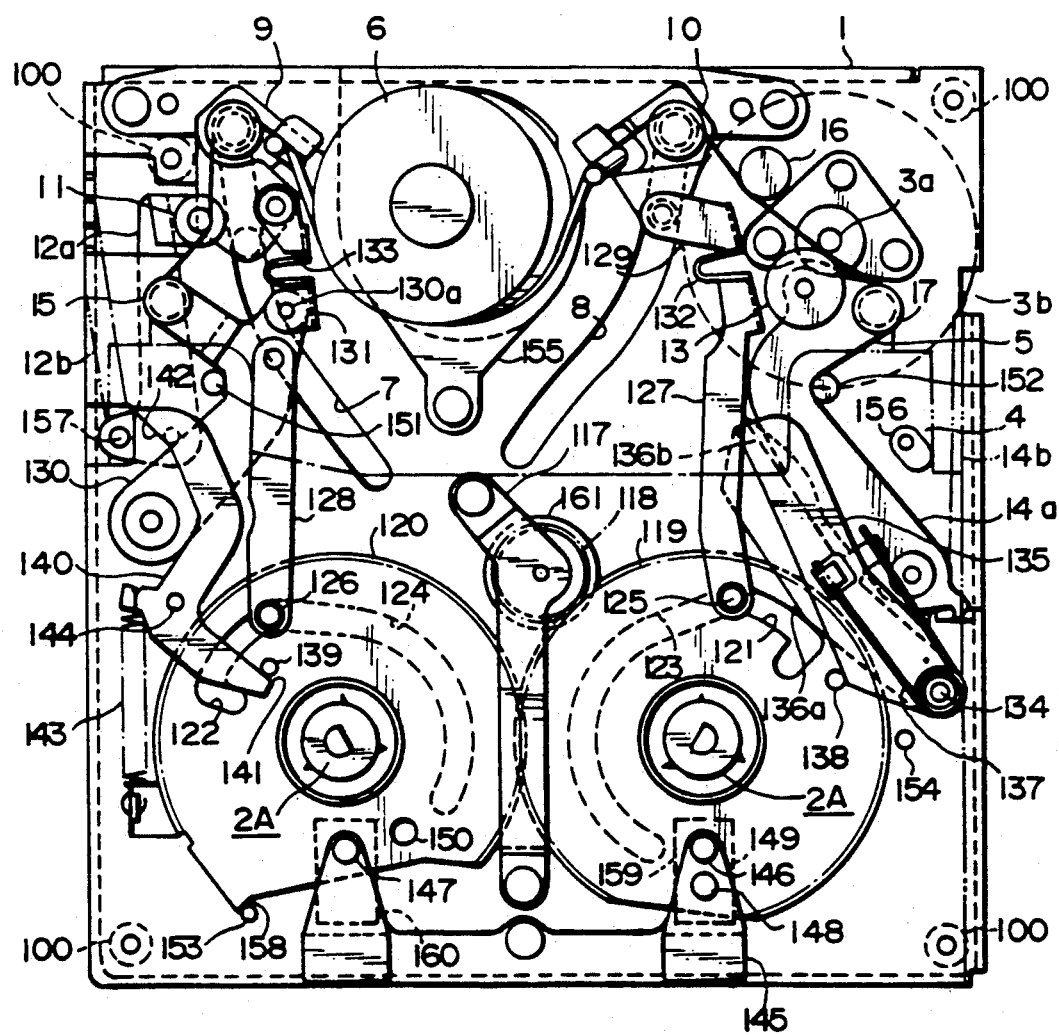
FIG. 1 is a fragmentary plan view of a magnetic recording and reproducing apparatus according to a first embodiment of this invention, chiefly showing parts attached to an upper surface of a chassis upon completion of loading.

FIG. 1 shows various parts attached chiefly to the upper surface of a chassis upon completion of loading. Chiefly in FIG. 1, reference numeral 1 designates a chassis; 2A, 2A, a pair of reel spindles mounted on the chassis 1; 3a, a capstan supported on the chassis 1; 3b, a flywheel fixed to the capstan 3a; 4, a tape cassette adapted to be loaded on the chassis 1 and engageable with the reel spindles 2A, 2A; 5, a magnetic tape wound on the tape cassette 4; 6, a rotary head drum mounted on the chassis 1 and equipped with a magnetic head; 7, 8, first and second guide grooves formed in the chassis 1; 9, 10, a pair of tape drawing members respectively received in the guide grooves 7, 8; 11, a tension pole on the chassis 1; 12a, a tension pole pivotally mounted on the chassis 1 and supporting the tension pin 11; 12b, a tension spring connected at opposite ends to the tension arm 12a and the chassis 1, respectively; 13, a pinch roller supported on the chassis 1; 14a, a pinch arm on which the pinch roller 13 is rotatably supported; and 15, 16, 17, three tape guides mounted on the chassis 1.

The reel spindles 2A, 2A are the supply side spindle and the take-up side spindle, and each spindle is composed of a reel hook 2a engageable with a hub of the tape cassette 4, a stem 2b, a reel rest 2c, reel coils (described below) 103, and an axle 2d attached to a metal substrate (described below) 101.

Figure 2:
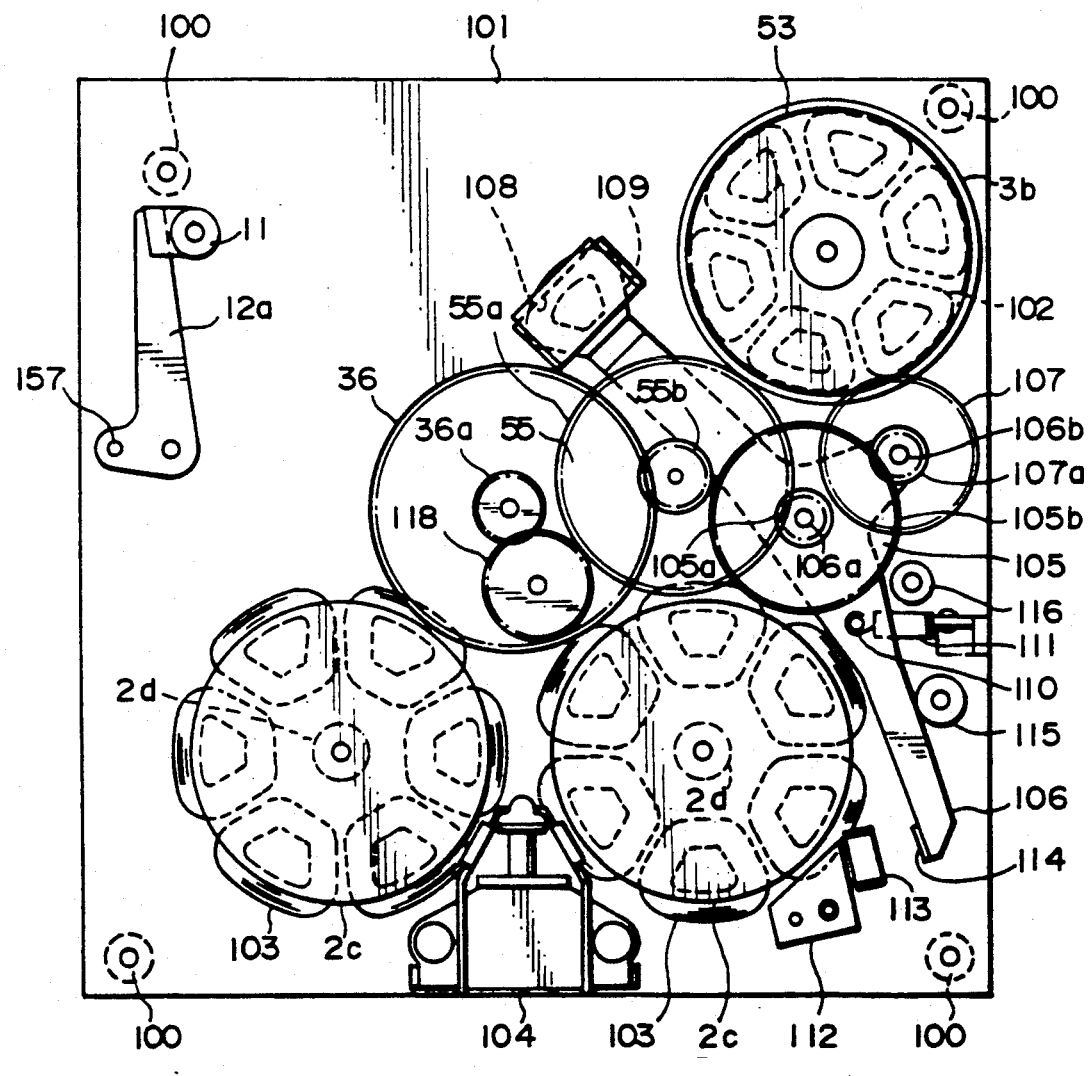
FIG. 2 is a plan view chiefly showing parts attached to a lower surface of the chassis of FIG. 1.

In FIGS. 1 and 2, 100 designates four posts fixed to the chassis 1; 101, a metal printed circuit wired substrate (hereinafter called "metal substrate"); 102, capstan coils attached to the metal substrate 101 and arranged around the capstan 3a; 103, reel coils attached to the metal substrate 101 and arranged around the reel spindle 2A; 104, a reel brake mounted on the metal substrate 101; and 105, a transmission gear rotatably mounted on the lower surface of the chassis by a pivot 106a and meshing a large gear portion 55a of a transmission gear 55 via a small gear portion 105a. 106 designates an arm pivotally mounted on the chassis 1, along with the transmission gear 105, by the pivot 106a; and 107, a clutch gear rotatably mounted on a part of the arm 106 by a pivot 106b and meshing the large gear portion 105b of the transmission gear 105 via a small gear portion 107a. 108 designates a first permanent magnet fixed to a part of the arm 106; 109, a clutch coil disposed substantially right under the first permanent magnetic 108 and attached to the metal substrate 101; 110, a pin mounted on the arm 106; 111, a tension spring connected at one end to the pin 110 and at the other end to a part of chassis 1; 112, a holder mounted on the lower surface of the chassis 1; 113, a second permanent magnet fixed to the holder 112; 114, a contact portion formed by bending a part of the arm 106; 115, 116, bearing portions fixed to the lower surface of the chassis 1; 117, a holder mounted on the upper surface of the chassis 1; 118, a transmission gear rotatably mounted on the holder 117 and meshing a small gear portion 36a of a transmission gear 36; 119, a first cam gear rotatably supported on the chassis 1, with a part of one of the reel spindles 2A inserted in the first cam gear 119, and meshing the transmission gear 118; 120, a second cam gear rotatably supported on the chassis 1, with a part of the other reel spindle 2A inserted in the second cam gear 120, and meshing the first cam gear 119; 121, 122, first cam grooves formed in the first cam gear 119 and the second cam gear 120, respectively; 123, 124, second cam grooves formed in the chassis 1; 125, 125, first rollers received in the first cam groove 121 and the second cam groove 123, respectively; 126, 126, second rollers received in the first cam groove 122 and the second cam groove 124, respectively; 127, a first rod rotatably supporting on its one end the first rollers 125; 128, a second rod rotatably supporting on its one end the second rollers 126; 129, a link fixed at one end to the first rod and pivotally connected at the other end to a part of the tape drawing member 10; 130, an arm pivotally connected to the chassis 1, supporting on its part the tape guide 15 attached thereto and also supporting on its part the second rod 128 rotatably mounted thereon; 131, a link pivotally connected at one end to the arm 130 and at the other end to a part of the tape drawing member 9; 132, 133, resilient portions respectively formed with the links 129, 131; 134, a shaft inserted through the bearing 115; 135, 136a, levers pivotally mounted on the shaft 134; 136b, a contact portion formed by bending a part of the lever 136a; 137, a torsion spring connected at one end to the lever 135 and at the other end to the lever 136a; 138, 139, pins mounted on the first cam gear 119 and the second cam gear 120, respectively; 140, a lever pivotally supported on the chassis 1 by a pivot 144; 141, a contact portion formed on a part of the lever 140; 142, a locking portion formed on a part of the lever 140; 143, a tension spring connected at one end to a part of the lever 140 and at the other end to a part of the chassis 1; 145, a holder mounted on the chassis 1; 146, 147, 148, photoelectric switches supported on the holder 145; 149, 150, detection holes formed in the first cam gear 119 and the second cam gear 120, respectively; 151, 152, 153, 154, pins mounted on the chassis 1; 155, a holder attaching to the rotary head drum 6 to the chassis 1; 156, an escape hole formed in the chassis 1; 157, a pin mounted on the tension arm 12; 158, a contact portion formed on a part of the second cam gear 120; 159, 160, reflecting sheets attached to the chassis 1; and 161, an escape hole formed in the chassis 1 and extending through the transmission gear 118.

Loading Action of the First Embodiment

Figure 3:
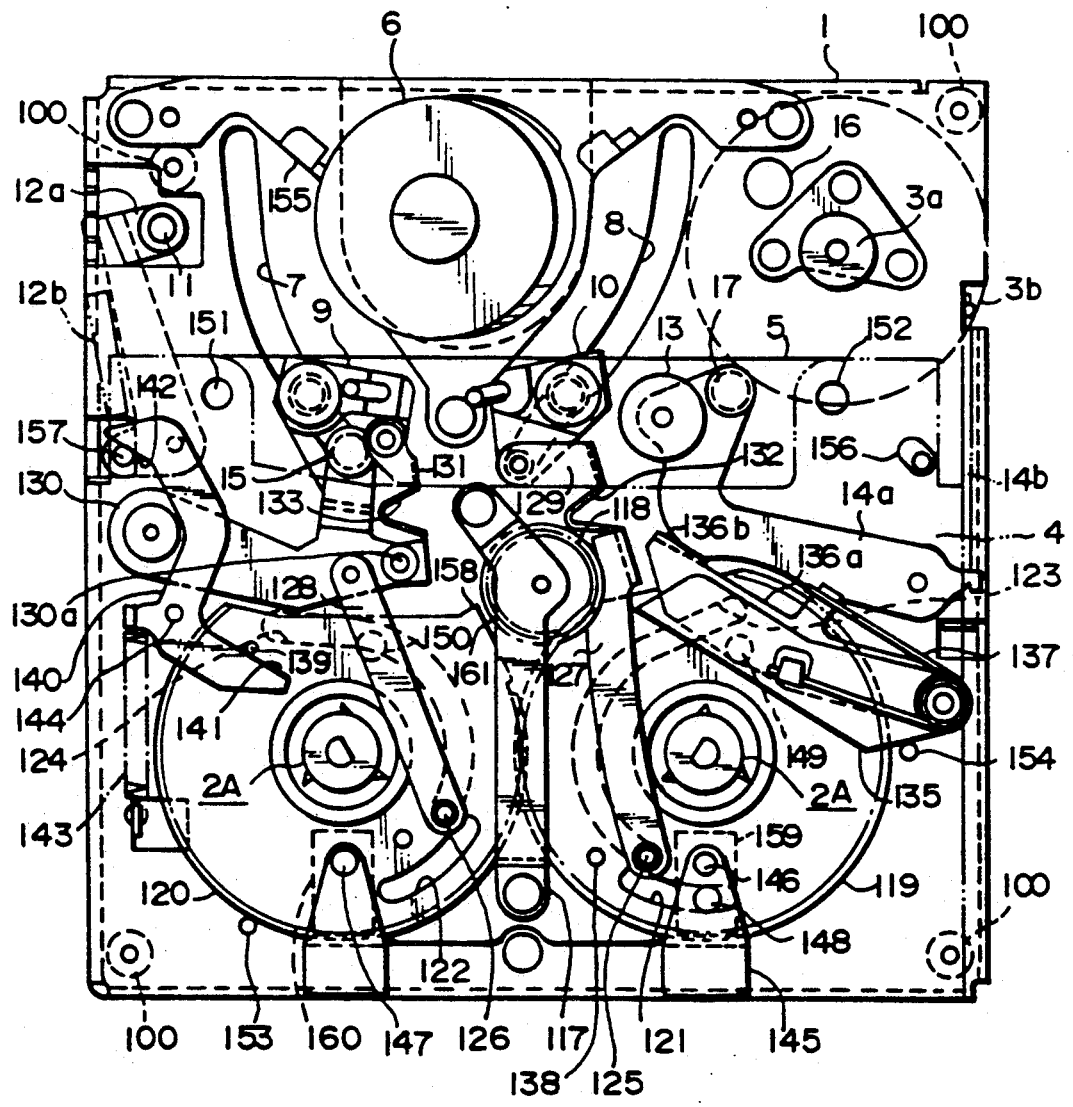
FIG. 3 is a view similar to FIG. 1, showing the parts attached to the upper surface of the chassis during loading.
Figure 4:
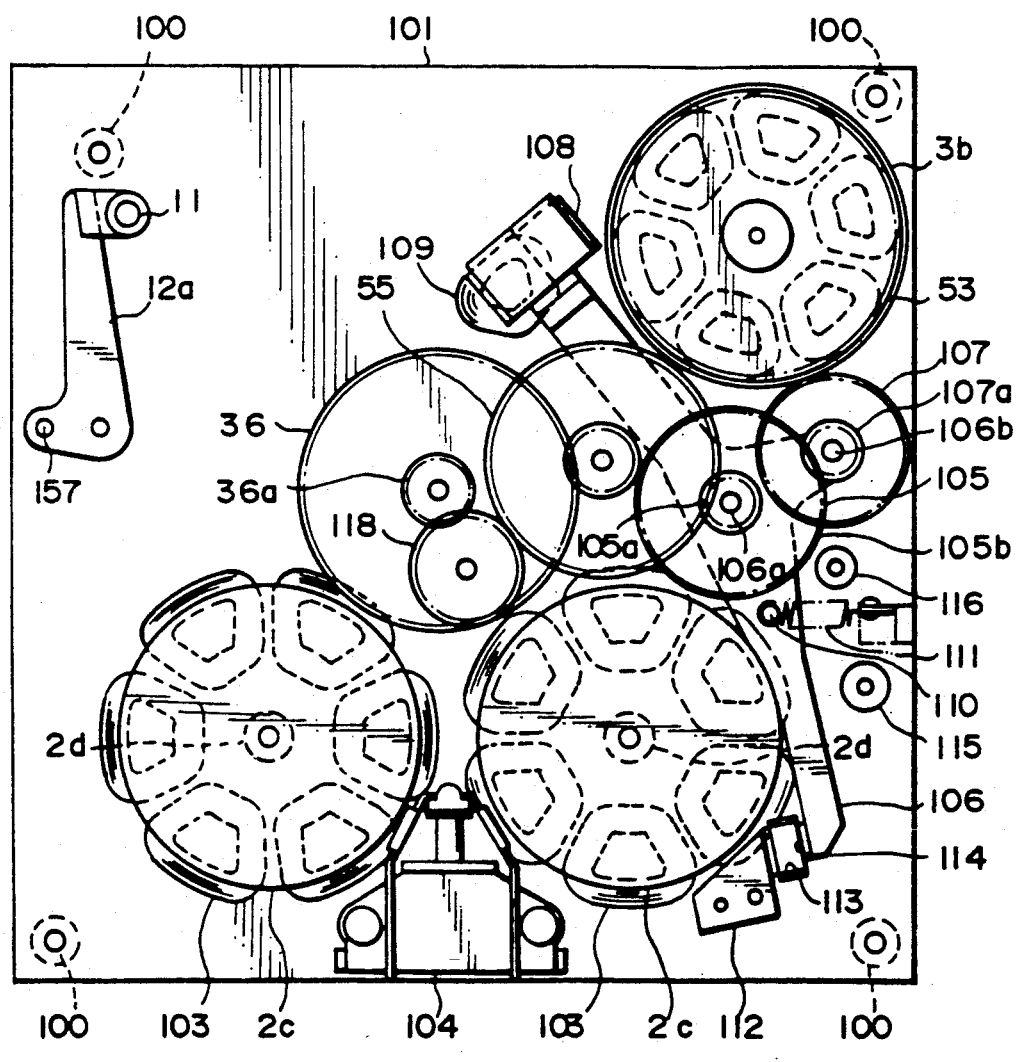
FIG. 4 is a view similar to FIG. 2, showing the parts attached to the lower surface of the chassis of FIG. 3.
Figure 5:
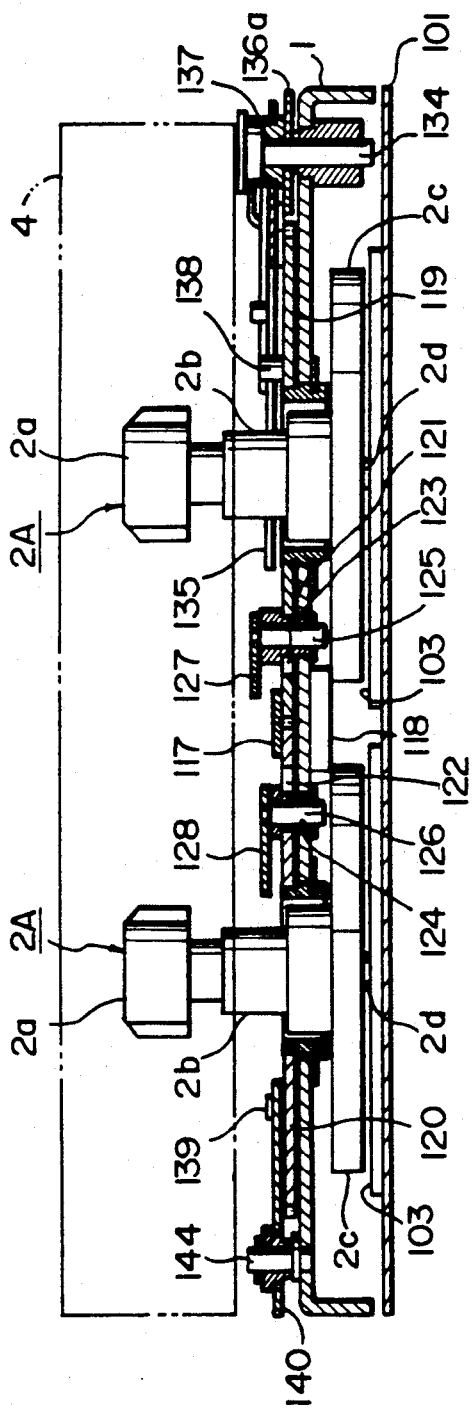
FIG. 5 is a vertical cross-sectional view showing the parts around a pair of reel spindles of FIG. 3.
Figure 6:
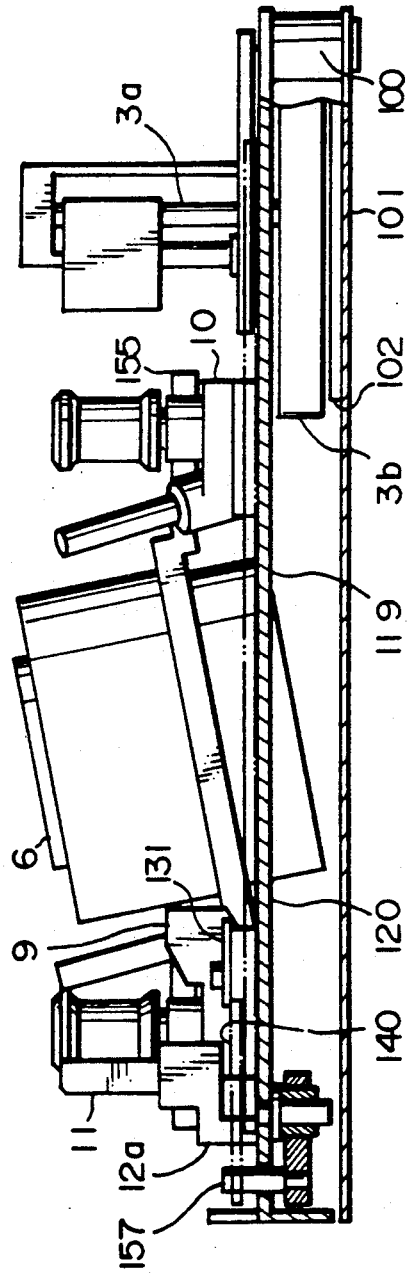
FIG. 6 is a vertical cross-sectional view showing a rotary head drum of FIG. 1.
Figure 7:
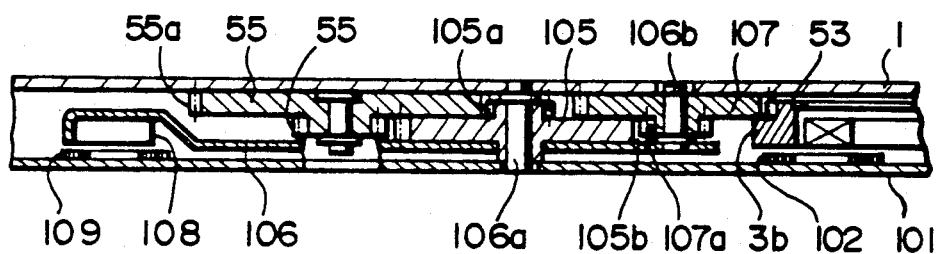
FIG. 7 is a cross-sectional view showing clutch gears of FIG. 2.
Figure 8:
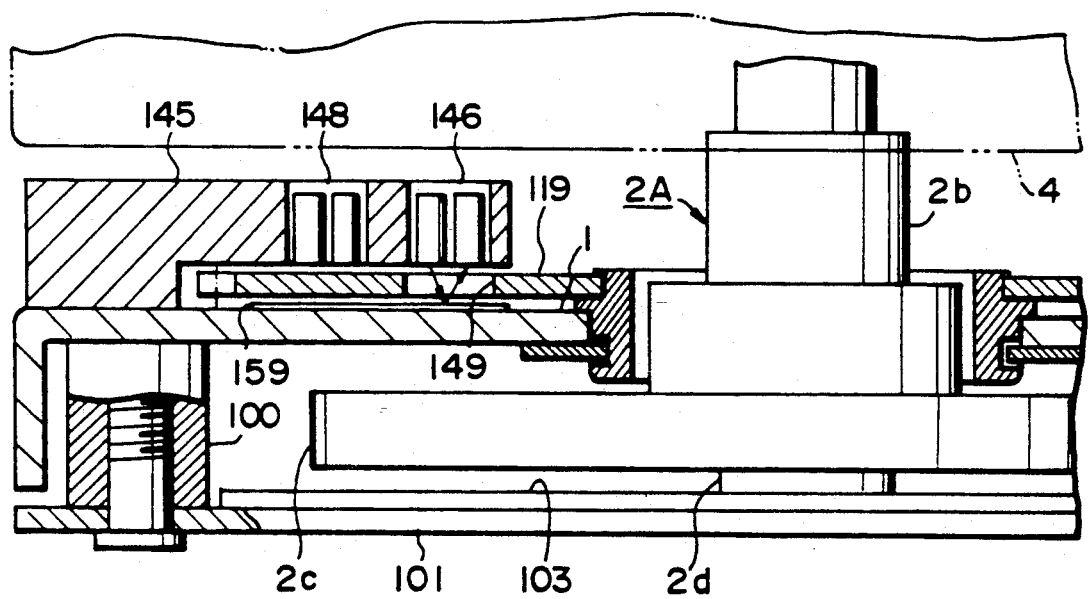
FIG. 8 is a cross-sectional view showing the operation of photoelectric switches of FIG. 1.

The operation of the tape loading mechanism will now be described. FIGS. 3 and 4 show a first position, namely, a before-loading position in which the tape drawing members 9, 10, the tension pin, and the pinch roller 13 can be drawn out of the tape cassette 4. FIGS. 1 and 2 show a second position, namely, a loading-completion position in which the magnetic tape is drawn from the tape cassette 4 and is brought against the magnetic head of the rotary head drum 6.

In FIG. 4, as loading starts, a current flows in a conductive pattern print-wired on the metal substrate and soldered to the clutch coil 109. Thus according to Fleming's left-hand rule, a thrusting force acts on the first permanent magnet 108 perpendicularly to the magnetic flux directing toward the current flowing in the coil 109 so that the arm 106 is pivotally moved counterclockwise under the bias of the tension spring 111 and against the attracting force between the second permanent magnetic 113 and the contact portion 114 until a part of the arm 106 hits the bearing 115. This causes the clutch gear 107 to mesh the gear 53 formed on the outer periphery of the flywheel 3b and to thereby assume the position of FIG. 2.

At that time, since the flywheel 3b is rotated clockwise by the permanent magnet fixed in the flywheel 3b and the action of the current flowing in the capstan coil 102, the rotating force of the flywheel 3b is transmitted to the first cam gear 119 via the transmission gears 105, 55, 36, 118 so that the first cam gear 119 is rotated clockwise in FIG. 3. Meanwhile, the second cam gear 120 meshing the first cam gear 119 is rotated counterclockwise upon receipt of the rotating force from the first cam gear 119. Accordingly, since the rollers 125, 126 are moved clockwise and counterclockwise by the first cam grooves 121, 122, respectively, and are then moved respectively along the second cam grooves 123, 124, the first and second rods 127, 128 respectively causes the tape drawing member 10 and the arm 130 to move to the respective positions of FIG. 1. And the tape drawing member 9 is moved to the position of FIG. 1 along the guide groove 7 in cooperation with the link 131 in response to the pivotal movement of the arm 130. During that time, the tape drawing members 9, 10 come in contact with the side surface of the holder 155 but are respectively pushed upwardly by the first rod 127 and the arm 130 so that the resilient portions 132, 133 flex, causing the tape drawing members 9, 10 to create a pressing force on the holder 155. While the first cam gear 119 is rotated clockwise, the pin 138 hits the side surface of the first cam gear 119 to cause the levers 135, 136a to pivotally move clockwise. Thus by the contact portion 136b, the pinch arm 14a is pivotally moved clockwise to bring the tape guide 17 against the magnetic tape 5 so that the pinch roller 13 comes in contact with the capstan 3, the tape guide 17 being mounted on the pinch arm 14a. Also, as the first cam gear 119 is rotated clockwise, the lever 135 is pivotally moved clockwise so that the torsion spring 137 flex to cause the pinch roller 13 to press the magnetic tape 5 against the capstan 3a. Further, when the pin 139 hits the contact portion 141, the lever 140 is pivotally moved clockwise against the bias of the tension spring 143 so that the pin 157 is released from the locking portion 142. Therefore the tension arm 12 is pivotally moved under the bias of the tension spring 12b so that the tension pin 11 tensions the magnetic tape 5.

When the detection hole 149 comes right under the photoelectric switch 146 as the first cam gear 119 is pivotally moved, light emitted from the light-emitting element, which light had been diffused by a rough surface of the first cam gear 119 by this time, is reflected by the reflecting sheet 159 and then strikes the light-receiving element to switch the photoelectric switch 146 on. Thus completion of loading has been detected. So as the current reversely flowing in the clutch coil 109, the arm 106 is pivotally moved clockwise to cause the contact portion 114 is attracted to the second permanent magnet against the bias of the tension spring 111. This releases the meshing engagement between the clutch gear 107 and the gear 53, and therefore, the rotating force to the first and second cam gears 119, 120 is freed so that the flywheel 3b rotates in an arbitrary direction to feed the magnetic tape 5 sandwiched between the capstan 3a and the pinch roller 13.

At that time, the first cam gear 119 tends to continues rotating clockwise as the pin 138 is urged by the torsion spring 137, but the contact portion 158 is located against the pin 153 to thereby prevent the first and second cam gears 119, 120 from rotating. The pin 39, to which reaction is transmitted by the tension spring 143, creates a force so as to rotate the second cam gear 120 clockwise. The latter force is weaker than the former one.

Figure 9:
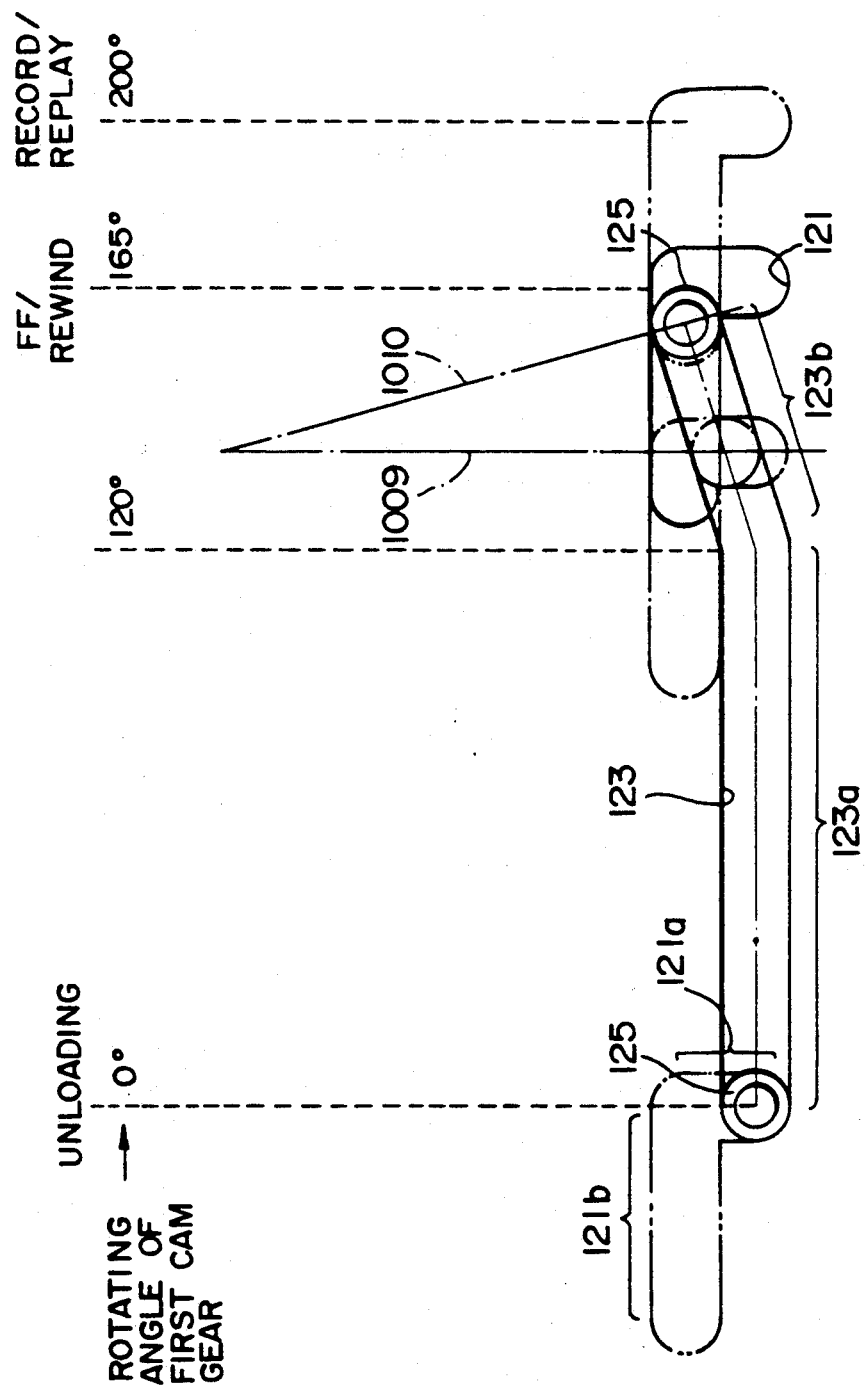
FIG. 9 is a schematic view showing a cam groove of a cam gear of FIG. 1.

The relation between the first cam groove 121 and the second cam groove 123 as well as the relation between the first cam groove 122 and the second cam groove 124 will now be described in detail in connection with FIG. 9. The cam groove 121 has an A portion 121a extending substantially radially, and a B portion 121b extending concentrically of the axis of rotation of the first cam gear 119. The cam groove 123 has a C portion 123a extending concentrically of the axis of rotation of the first cam gear 119, and a slant portion 123b extending in such a manner that the distance between the slant portion 123b and the center of rotation of the first cam gear 119 increases progressively as the first cam gear 119 advances clockwise. FIG. 9 shows the two cam grooves 121, 123 as their concentric portions are expanded in straight (assuming that the radius of the first cam gear 119 is infinity). From before the start of loading until the first cam gear 119 is pivotally moved through about 120 degrees, the circumferential movement and the radial movement of the roller 125 are restricted by the A portion 121a of the cam groove 121 and the C portion 123a of the cam groove 123, respectively, as the roller 125 is moved. As the first cam gear 119 is turned through about 120 degrees, the roller 125 is guided outwardly of the axis of rotation of the first cam gear 119. During that time, the imaginary line 1010 connecting between the axis of turning of the tape drawing member 10 and the link 129 and the axis of rotation of the roller 125 comes round rightwardly of the imaginary line 1009 connecting between the axis of turning of the tape drawing member 10 and the link 129 and the axis of rotation of the first cam gear 119. Therefore the roller 125 does not slip leftwardly of the slant portion 123b even when received the reaction of the resilient portion 132, but it rather stops at the rightmost end of the slant portion 123b.

Figure 10:
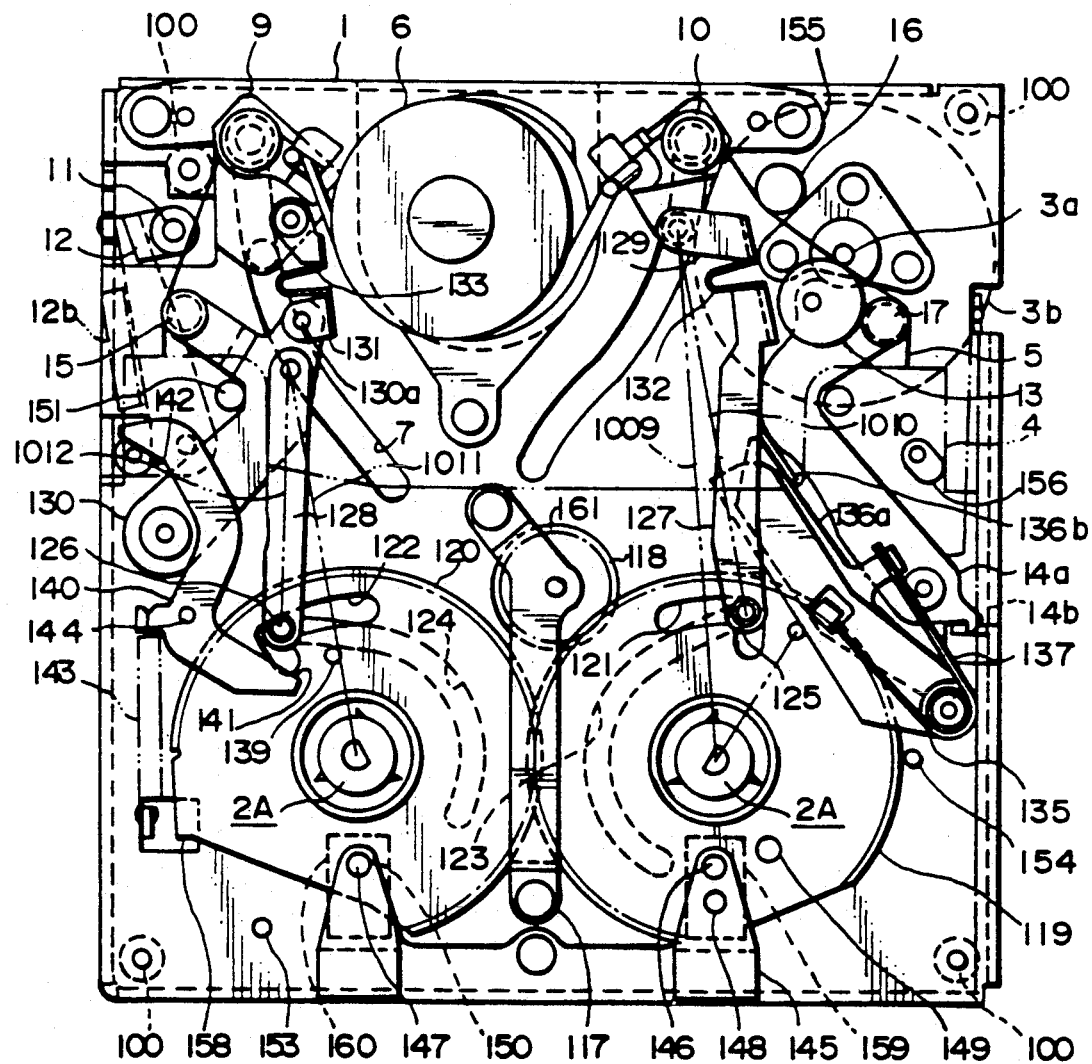
FIG. 10 is a view similar to FIG. 1, showing the parts in a fast-forward/rewind position.
Figure 11:
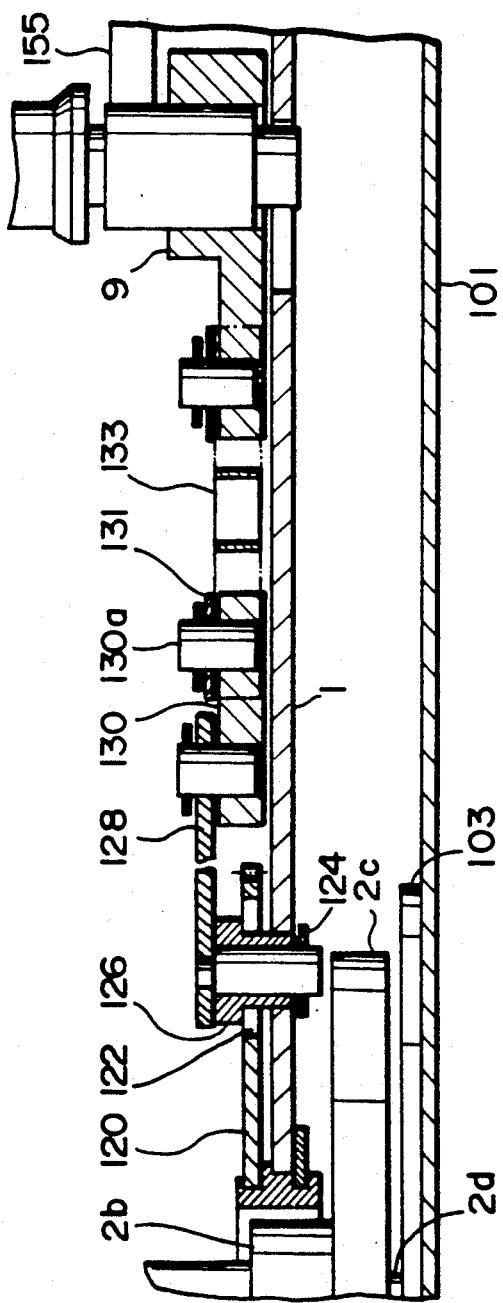
FIG. 11 is a fragmentary, enlarged cross-sectional view showing a cam groove and a tape drawing member of FIG. 1.

In this position (With the cam groove 121 in the solid-line position), the roller 125 does not cause the first cam gear 119 to rotate with respect to the cam groove 121 while the pinch arm 14a is still in loading. As shown in FIG. 10, the magnetic tape 5 is disposed against the guide roller 17 and is not in contact with the pinch roller 13. Also the biasing force of the tension spring 14b acting on the pin 138 is substantially aligned with the axis of rotation of the first cam gear 119 and hence is not enough to rotate the first cam gear 119. If the photoelectric switch 147 is turned ON so that the detection hole 150 comes right under the photoelectric switch 147 at this time point, the current flows reversely to the clutch coil 109 to bring the clutch gear 107 away from flywheel 3b. Then the rotation of the first and second cam gears 119, 120 terminate to take a mode for fast-forward feeding and rewinding the magnetic tape 5. In this position, since the pin 139 is not in contact with the contact portion 141, the tension arm 12 is pushed against the locking portion 142 by the pin 139 against the bias of the tension spring 12b so that the magnetic tape 5 is fed at high speed without contacting the tension pin 11. When shifting from the fast-forward-/rewind mode to the record/reproduce mode, the B portion 121b of the cam groove 121 is moved past the outer peripheral surface of the roller 125 so that no external force is exerted on the roller 125, keeping the rod 127 and the tape drawing member 10 in position. The relation between the cam groove 122 and the cam groove 124 is virtually a mirror image symmetry with respect to a line perpendicularly to a line connecting between the two reel spindles 2A, 2A. Further, since the imaginary line connecting between the axis of turning of the arm 130 and the rod 128 and the axis of rotation of the roller 126 comes leftwardly of the imaginary line 1011 connecting between the axis of turning of the arm 130 and the rod 128 and the axis of rotation of the second cam gear 120, no force is given reversely to such a direction as to drive the second cam gear 120 (counterclockwise).

For releasing the magnetic tape 5 from the magnetic head of the rotary head drum 6, the clutch coil 109 is energized to bring the clutch gear 107 into meshing engagement with the gear 53, causing the flywheel 3b to rotate in the direction reverse to that when loading, namely, counterclockwise. As this rotating force is transmitted to the transmission gear 105, 55, 36, 118 of the clutch gear 107, the first cam gear 119 is rotated counterclockwise to cause the second cam gear 120 to rotate clockwise due to the meshing engagement with the first gear 119. When the B portion 121b of the cam groove 121 comes right under the photoelectric switch 148, the photoelectric switch 148 is turned on to thus detect that unloading has been completed, releasing the meshing engagement between the clutch gear 107 and the gear 53.

Figure 12:
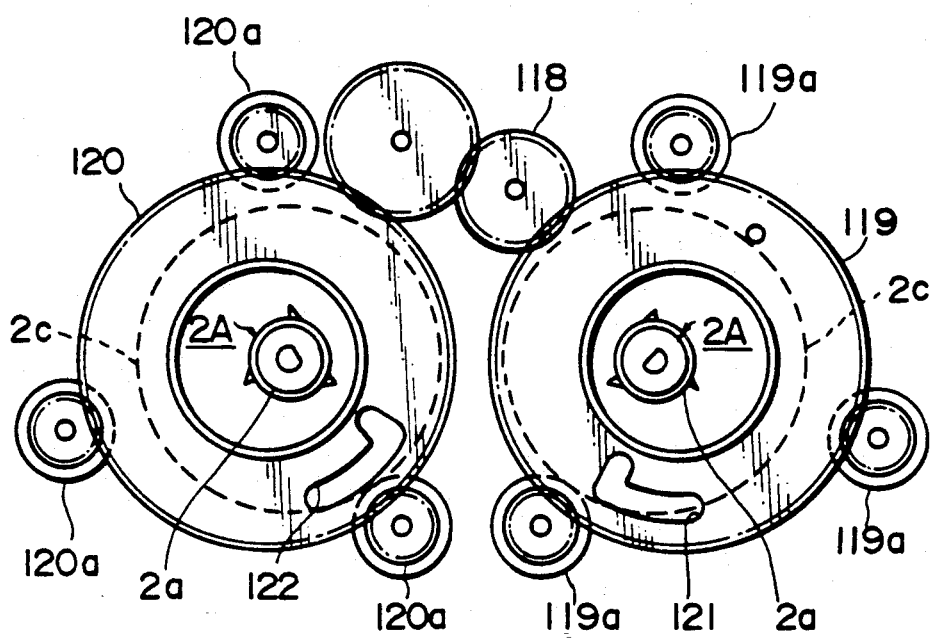
FIGS. 12 and 13 are plan views respectively showing the structures of modified loading disks.
Figure 13:
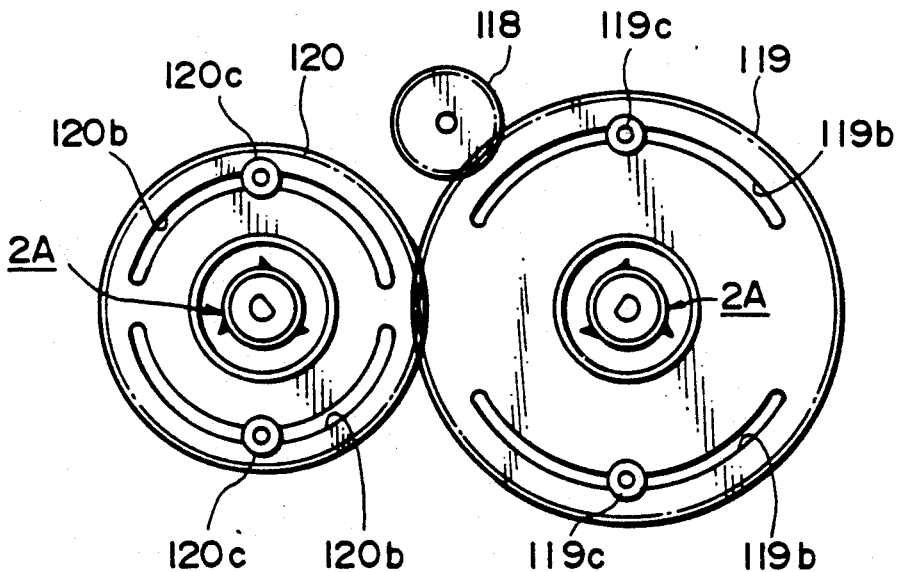

In the foregoing embodiment, the axis of rotation of each of the first and second cam gears 119, 120 is in alignment with the axis of rotation of a respective one of the reel spindles 2A. Alternatively, they may be out of alignment with each other as shown in FIG. 12.

Further, in the foregoing embodiment, the rotating force from one of the transmission gears 118 is transmitted to the first cam gear 119 and then the second cam gear 120. In the example of FIG. 12, the first and second cam gears 119, 120 do not directly mesh each other and receive the power transmission from the transmission gears in parallel, in which case the first and second cam gears 119, 120 are different in angle of rotation from each other. Further, the first and second cam gears 119, 120 may be in direct meshing with each other or may be different in radius of pitch circle. Or one of the first and second cam gears, like the other transmission gears, may be a double gear composed of a large gear and a small gear.

Yet in the foregoing embodiment, each of the first and second cam gears 119, 120 is supported by a hollow bush clinched to the respective cam gear. However, the outer periphery of each of the first and second cam gears 119, 120 may be supported by a plurality of gears 119a, 120, as shown in FIG. 12. In another alternative form, which is also shown in FIG. 12, each of the first and second cam gears 119, 120 may have in its body a slit 119b, 120b, and a shaft 119c, 120c may be threaded through the slit 119b, 120b.

Figure 14:
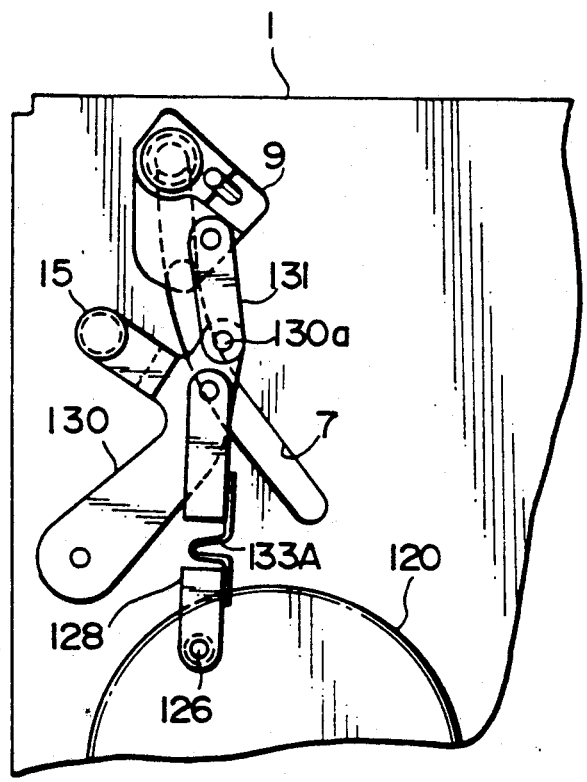
FIG. 14 is a fragmentary plan view showing a modified tape drawing link mechanism.

Still further, in the foregoing embodiment, each of the first and second cam gears 119, 120 are disposed beside the stem 2b axially of the respective reel spindle 2A. Alternatively, it may be disposed beside any one of the reel hook 2a, the reel rest 2c, the reel axle 2d and the reel coil 103. In addition, the resilient portion 133 is formed on a part of the link 131 in the above embodiment, but may be formed on a part of the rod 128 as shown in FIG. 14, or may be formed on either the link 131 or the rod 128, which is not shown here.

Furthermore, the above embodiment is directed to the arrangement associated with the tape guide 15 and the tape drawing member 9 on the tape supply side (left side in FIG. 1). This invention may be applied to the arrangement associated with the tape guide 17 and the tape drawing member 10 on the tape supply side (right side in FIG. 1), obtaining the same results.

According to this embodiment, because each of the cam gears has in or on its body a geometric groove or a pin is rotatably supported on the chassis by inserting a part of the respective reel spindle, a thin, small-sized apparatus can be achieved.

Further, because the link to which the tape drawing member is attached is rotatably connected directly to the arm on which the tape guide is mounted, the tape guide and the tape drawing member can be moved by a common driving mechanism, minimizing the number of parts and hence making the apparatus simple in structure and compact in size.

Loading Mechanism of the Second Embodiment

A modified loading mechanism of the second embodiment of this invention will now be described in connection with FIGS. 15 through 21.

Figure 15:
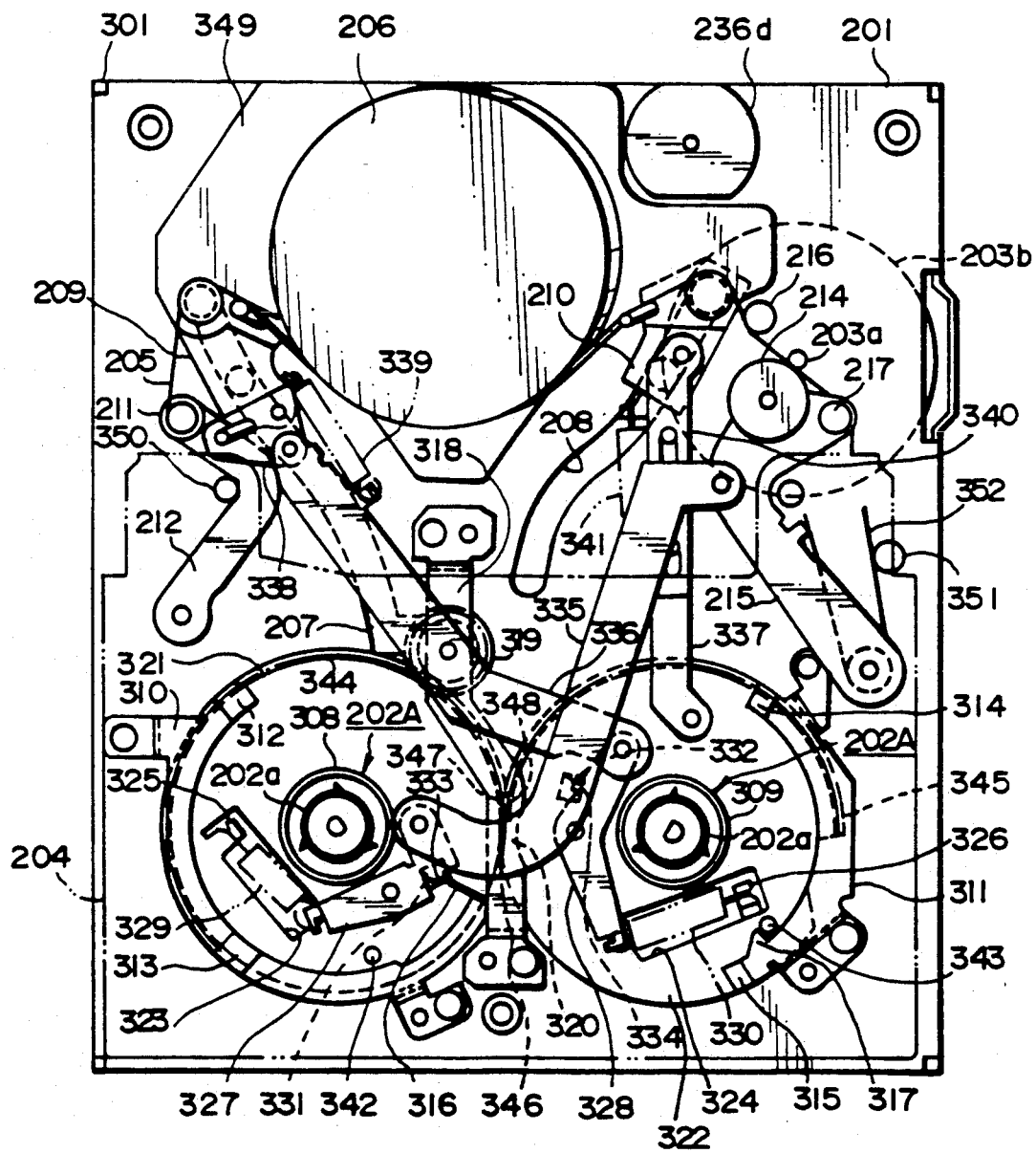
FIG. 15 is a fragmentary plan view of a modified magnetic recording and reproducing apparatus according to a second embodiment, chiefly showing parts attached to the upper surface of a chassis in the fast-forward/rewind-standby position upon completion of loading.
Figure 16:
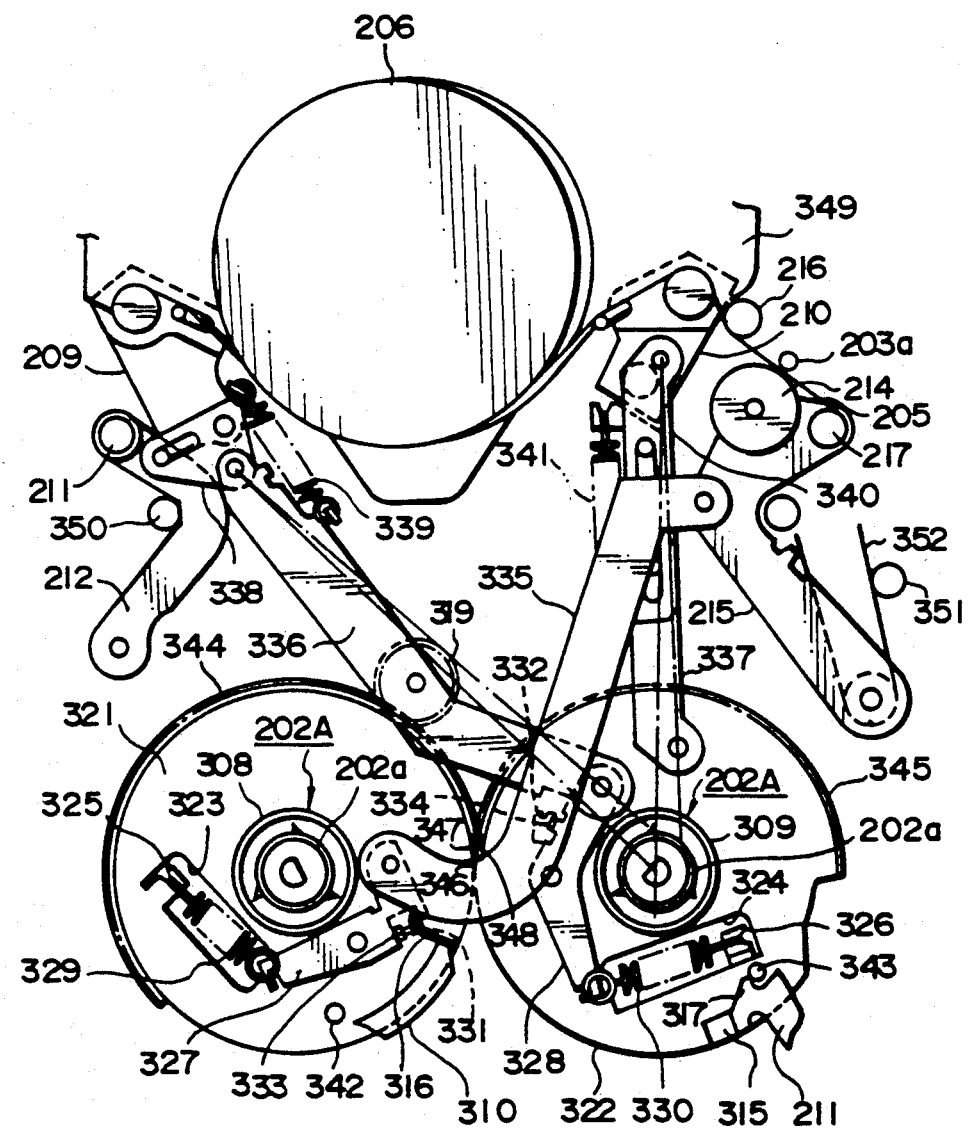
FIG. 16 is a fragmentary, enlarged plan view of FIG. 15.

In FIGS. 15 and 16, reference numeral 201 designates a chassis; 202A, 202A, a pair of reel spindles mounted on the chassis 201; 203a, a capstan supported on the chassis 201; 203b, a flywheel fixed to the capstan 203a; 204, a tape cassette adapted to be loaded on the chassis 201 and engageable with the reel spindles 202A, 202A; 205, a magnetic tape wound on the tape cassette 204; 206, a rotary head drum mounted on the chassis 201 and equipped with a magnetic head; 207, 208, first and second guide grooves formed in the chassis 201; 209, 210, a pair of tape drawing members respectively received in the guide grooves 207, 208; 211, a restriction pin; 212, an arm pivotally mounted on the chassis 201 and supporting the restriction pin 211; 214, a pinch roller supported on the chassis 201; 215, a pinch arm on which the pinch roller 214 is rotatably supported; and 216, 217, two tape guides supported by the chassis 1.

In FIGS. 15 through 21, 300 designates a post fixed to the Chassis 201; 301, a metal printed circuit wired substrate (hereinafter called "metal substrate") attached to the chassis 201 via the post 300; 302, a reel coil attached to the metal substrate 301; 303, a gear forced in a loading motor 236d; 304, 305, 306, 307, four transmission gears pivotally mounted on the lower surface of the chassis 201; 308, 309, bushes fixed to the chassis 201; 310, 311, clamps attached to the chassis 201; 312, 313, contact portions formed on the clamp 310; 314, 315, contact portions formed on the clamp 311; 316, a resilient portion formed on the clamp 310; 317, a locking portion formed on the clamp 311; 318, a holder attached to the upper surface of the chassis 201; 319, a transmission gear supported on the holder 318; 320, a contact portion formed on a part of the holder 318; 321, a first loading disk rotatably mounted on the outer periphery of the bush 308 and sandwiched between the clamp 310 and the chassis 201; 322, a second loading disk rotatably mounted on the outer periphery of the bush 309 and sandwiched between the clamp 311 and the chassis 201; 323, a cutout formed in the first loading disk 321; 324, a cutout formed in the second loading disk 322; 325, a locking portion formed on the first loading disk 321; 326, a locking portion formed on the second loading disk 322; 327, a lever pivotally supported on the first loading disk 321; 329, a tension spring connected at one end to the locking portion 325 and at the other end to the lever 327; 330, a tension spring connected at one end to the locking portion 326 and at the other end to the lever 328; 331, a cutout formed in the first loading disk 321; 332, a cutout formed in the second loading disk 322; 333, two contact portions formed on the respective levers 327; 334, a contact portion formed on the lever 328; 335, a rod pivotally mounted on the lever 327; 336, a rod pivotally mounted on the lever 328; 337, a rod pivotally mounted on a second loading disk 322; 338, a link pivotally mounted on to the rod 336; 339, a tension spring connected at one end to a part of the rod 336 and at the other end to a part of the link 338; 340, a rod slidably attached to the rod 337; 341, a tension spring connected at one end to a part of the rod 337 and at the other end to a part of the rod 340; 342, a pin mounted on the first loading disk 321; 343, a pin mounted on a part of the second loading disk 322; 344, a gear portion formed on the outer periphery of the first loading disk 321; 345, a gear portion formed on the outer periphery of the second loading disk 322; 346, a tooth-free portion formed in the outer periphery of the first loading disk 321; 347, a leading tooth of the gear portion 344; 348, a contact portion formed on the leading end of the gear portion 345; 349, a holder carrying the magnetic head 206 and supported on the chassis 201; 350, 351, are pins mounted on the chassis 201; and 352, a spring connected at one end to the pin 351 and at the other end to the pinch arm 215. The tape guide 217 is mounted on the pinch arm 215.

Loading Action of the Second Embodiment

Figure 18:
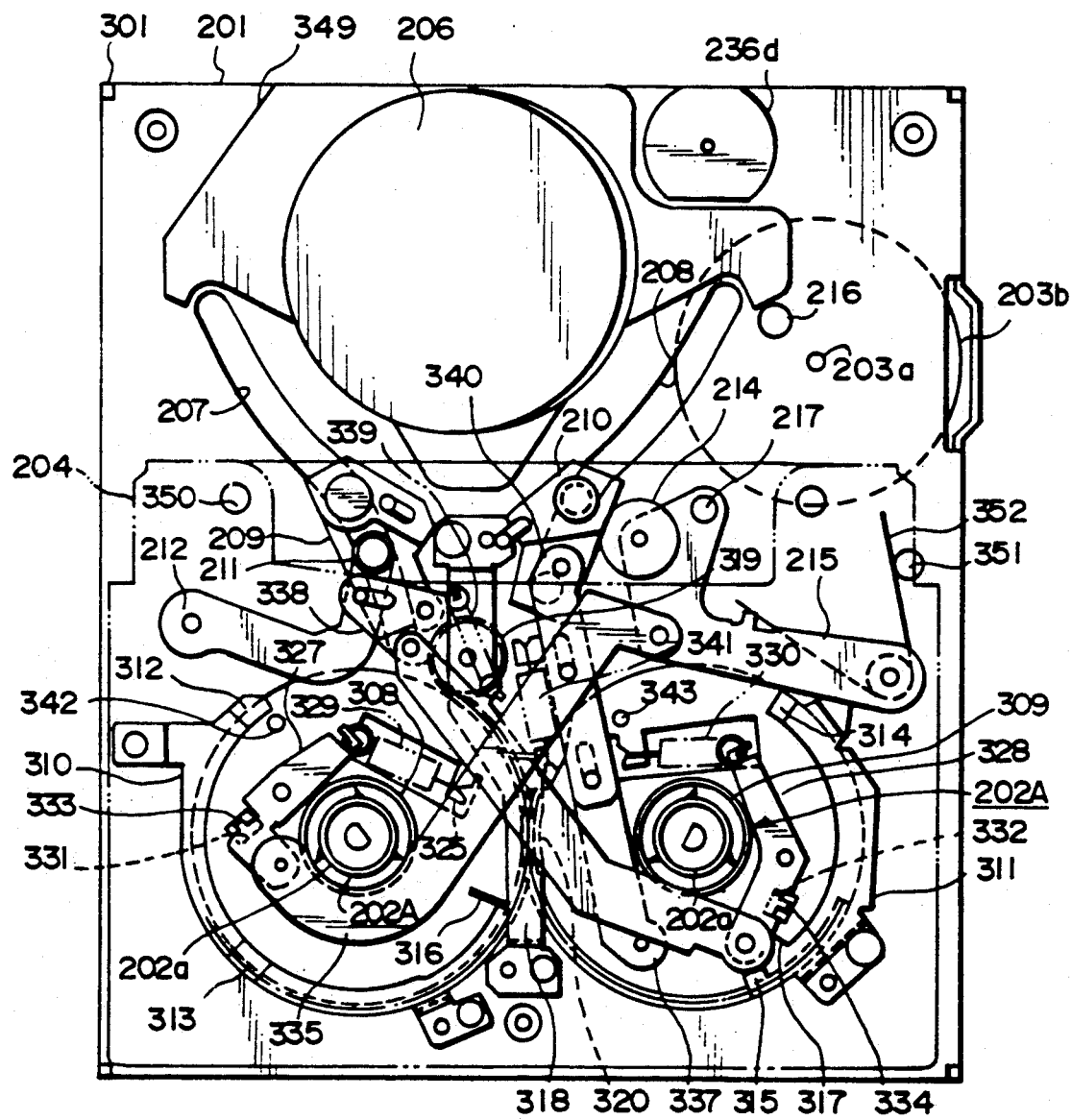
FIG. 18 is a view similar to FIG. 15, showing the individual parts during unloading of the second embodiment.
Figure 19:
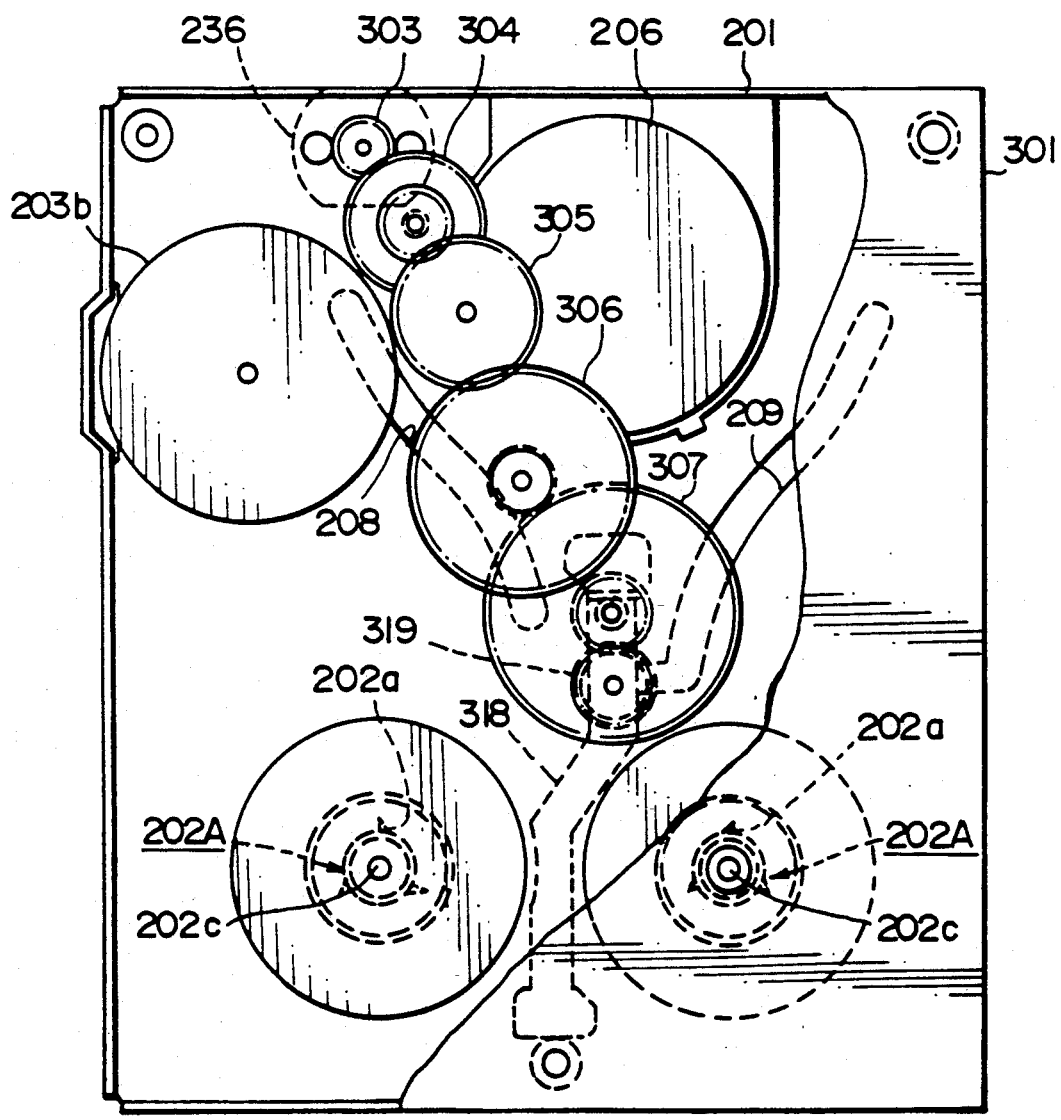
FIG. 19 is a rear view of FIG. 15.

The operation of the modified tape loading mechanism will now be described. FIG. 18 show a first position, namely, a before-loading position in which the tape drawing members 209, 210, the restriction pin 211, and the pinch roller 214 can be drawn out of the tape cassette 204. FIG. 15 shows a second position, namely, a loading-completion position in which the magnetic tape 205 is drawn from the tape cassette 204 and is brought against the magnetic head 206.

In FIG. 4, as loading starts, the loading motor 236d rotates. This rotating force is transmitted to the first loading disk 321 via the gear 303 and the transmission gears 304-307, 319 to rotate the first loading disk 321 counterclockwise. Upon receipt of the rotating force from the first loading disk 321, the second loading disk 322 engaging the first loading disk 321 is rotated clockwise.

Thus the levers 327, 328 are pivotally moved with the first and second loading disks 321, 322, respectively, so that the rods 335, 337 cause the tape drawing member 210 and the pinch arm 215, respectively, to move the position of FIG. 15. The tape drawing member 209 is moved along the guide 207 to the position of FIG. 15 in association with the link 33 in response to the pivotal movement of the arm 212. During that time, the tape drawing members 209, 210 are engageable with the side surface of the holder 349 while each of the rods 336, 337 is pushed upwardly due to the rotation of a respective one of the first and second loading disks 321, 322. Accordingly the lever 327 is pivotally moved counterclockwise against the bias of the tension spring 329, and the rod 340 slides against the bias of the tension spring 341 in such a direction as to shorten the distance between the rods 337, 340. The tape drawing members 209, 210 thereby create a pushing force on the holder 349.

Subsequently, as shown in FIG. 16, when the first loading disk 321 is further rotated by a slight extent counterclockwise, the pin 343 comes in contact with the locking portion 317 and, substantially at the same time, the meshing engagement between the gear portions 344, 348, which had performed power transmitting, is released as the leading tooth 347 leaves the contact portion 348, thereby stopping the rotation of the second loading disk 322.

At that time, since the reaction to the pressure of the tape drawing members 209, 210 comes round slightly rightwardly of the axis of rotation of the second loading disk 322, a pressure is created to release the contact between the locking portion 317 and the pin 343, namely, the engagement with the first loading disk 321. In this state, even if an external force such as vibration is exerted on the second loading disk 322, the second loading disk 322 is not rotated counterclockwise to keep the pushing position of the tape drawing members 209, 210.

By the moving action of the rod 336 and the link 338, the end surface of the arm 212 comes in contact with the pin 350 and hence is pushed by the tension spring 339. Further, the pinch arm 215 on which the tape guide 217 is mounted is urged in the counterclockwise direction reverse to that previously pivotally moved. This force pushes back the first loading disk 321 clockwise via the rod 335 so that the leading tooth 347 comes in contact with the contact portion 348 to create a pressure. The direction of this pressure is such that the second loading disk 322 is rotated counterclockwise. Since the sum of the reactions of the pressed and fixed tape drawing members 209, 210 is far larger than the force tending to rotate the second loading disk 322 clockwise, the second loading disk 322 will not be rotated. Therefore the pinch arm 215 will not be rotated even if an external force such as vibration.

In this position, according to a non-illustrated mode detecting mechanism, the apparatus enters the standby mode for the fast-forward/rewind operations, terminating rotation of the loading motor 236.

When the fast-forward feeding button or the rewinding button is depressed, the magnetic tape 205 is prevented from being engaged by the restriction pin 211, the tape drawing members 209, 210 and the tape guides 216, 217 and is thereby fed at high speed.

Then, when the reproducing button or the recording button is depressed, the first loading disk 321 is further rotated counterclockwise so that the pinch roller 214 mounted on the pinch arm 215 pivotally movable in response to the movement of the rod 335 comes in contact with the capstan 203a.

Figure 17:
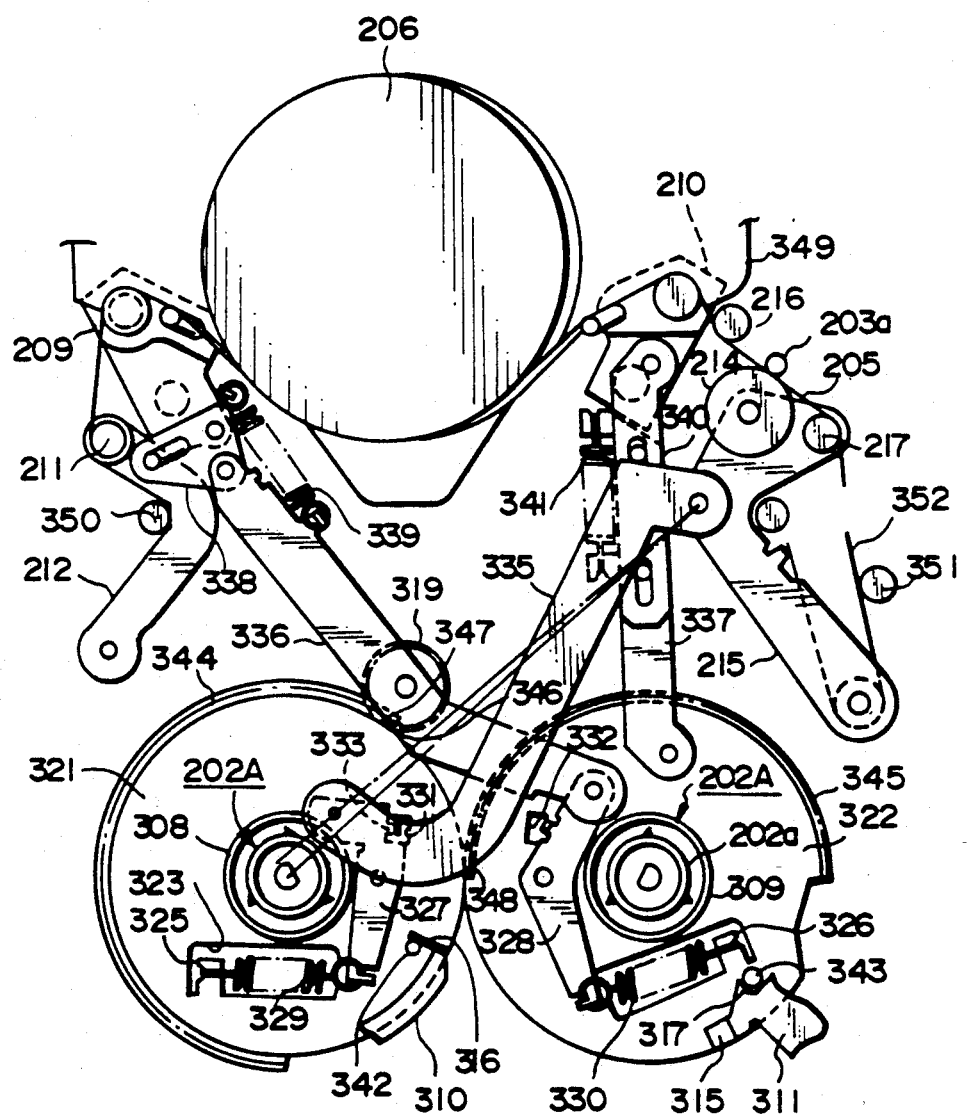
FIG. 17 is a view similar to FIG. 16, showing the individual parts during recording and reproducing.

Since the first loading disk 321 is still further rotated counterclockwise, the lever 327 is rotated counterclockwise against the bias of the tension spring 329, as shown in FIG. 17, so that the pinch roller 214 presses the magnetic tape 205 against the capstan 203a.

At that time, the pin 342 comes in contact with the resilient portion 316 to prevent rotation of the first loading disk 321. In this position, according to the non-illustrated mode detecting mechanism, the apparatus enters the mode for reproducing or recording the magnetic tape 205, terminating rotation of the loading motor 236d. Since the reaction to the pressure of the pinch roller 214 to the capstan 203a comes round leftwardly of the axis of rotation of the first loading disk 321, an additional force acts on the first loading disk 321 so as to further rotate the first loading disk 321 counterclockwise. Therefore even if the rotation of the loading motor 236d is terminated, the first loading disk 321 is fixed due to the engagement between the pin 342 and the resilient portion 316.

In this state, the capstan 203 is rotated at constant speed to feed the magnetic tape 205 at constant speed.

For stopping the reproducing or recording operation, when the stop button is depressed, the loading motor 236d is reversely rotated during loading so that the first loading disk 321 is rotated clockwise. The rod 335 is thereby moved downwardly to pivotally move the pinch arm 215 counterclockwise so that the pressing of the pinch roller 214 is released.

Further, as the first loading disk 321 is rotated clockwise, the leading tooth 347 comes in contact with the contact portion 348. At that time, according to the non-illustrated mode detecting mechanism, the apparatus enters the standby position for the fast-forward/rewind mode.

For taking the tape cassette 204 out of the apparatus, as the ejection button is depressed, the loading motor 236d is rotated to cause the first loading disk 321 to rotate clockwise. The leading tooth 347 thereby pushes the contact portion 348 downwardly to cause the gear portion 344 to engage the gear portion 345 so that the second loading disk 322 receives the rotating force from the first loading disk 321 to rotate counterclockwise. The rods 336, 337 are moved downwardly so that the tape drawing members 209, 210 are released from pressing against the holder 349 and hence are moves to the position of FIG. 18 along the respective guide grooves 207, 208. At that time, according to the non-illustrated mode detecting mechanism, the rotation of the loading motor 236d is stopped.

At the same time, the arm 212 is pivotally moved clockwise in response to the movement of the rod 336 and the line 338 and is stopped at the position of FIG. 18. At that time, the tension spring 339 restricts the moving posture of the link 338 having a plurality of fulcra of pivotal movement.

In this embodiment, the second loading disk 322 is disposed coaxially of the rightside reel spindle. Alternatively, the rod, arm or the like to which the tape drawing member is connected may be attached to the first loading disk 321 coaxially of the leftside reel spindle. Or the apparatus, like VHS-VTR deck for compact cassette, may be equipped only a single reel spindle.

For another alternative form, in addition to the tape drawing member to bringing the magnetic tape against the magnetic head, the rod, the lever and the like, which are connected to the arm on which the tension arm and other tape guide are mounted, may be attached to the loading disk.

According to this embodiment, a powersaving apparatus requiring no worm gears can be achieved. Also a thin, small-sized apparatus can be obtained.

Further, the mode determination can be reliably performed in terms of angle of rotation of the loading disk directly without many intermediate parts.

Still further, since in every mode the tape drawing member can be retained by the structure which is simple and minimizes the load to the tape loading drive source, this apparatus is inexpensive and is able to save the electrical energy to be consumed.

In addition, since either the loading disks or the clamps are in the form of metal plates, this apparatus is particularly easy to manufacture in a thin compact size.

In this embodiment, the rod 335 to which the pinch arm 215 is connected is attached to the first loading disk 321 engaging the transmission gear 319, and the rod 336 and the lever 328 to which the tape drawing member 209 is connected are attached to the second loading disk 322. These arrangements associated with the rightside and leftside reel spindles may be reversed.

Therefore, the respective operations of the tape drawing member and the pinch arm can be controlled independently, guaranteeing a thin, small-sized apparatus.

FIG. 21 shows a loading disk supporting structure of this embodiment.

In FIG. 21, reference numeral 308 designates a bush fixed to the chassis 201; 308a, a step portion formed on an upper surface of the bush 308; 308b, an outer peripheral surface of the step portion 308a; and 308c, an upper surface of the step portion 308a. Further, 310 designates a clamp attached to the chassis 201; 310a, a contact portion formed on the clamp 310; 321, a loading disk rotatably mounted on the bush 308 and having an inner peripheral surface 321a, which is in contact with the outer peripheral surface 308b of the step portion 308a of the bush 308, and an upper surface 321b of the outer peripheral edge, which surface is in contact with the contact portion 310a of the clamp 310. Thus the loading disk 321 is positioned in such a manner that its height from the chassis 201 is constant.

As described above, the loading disk 321 is supported in such a manner that its inner peripheral edge is rotatably supported on the outer peripheral surface 308b of the step portion 308a of the bush 308 and also in such a manner that its center line is aligned with its axis of rotation. Also, the loading disk 321 is supported in such a manner that its height from the chassis 201 is constant by the upper surface 308c of the step portion 308a and the three contact portions formed on the clamp 310. Thus, during rotating the loading disk 321, the center line of the loading disk 321 is free from being displaced off its axis of rotation and also from being inclined.

Partly since the rotational force of the drive gear is smoothly transmitted to the loading disk 321 and partly since the driving force of the loading disk 321 also is smoothly transmitted to the lever or the like, it is free from any damage of teeth of the gear portion 344 and from any abnormal tape traveling path. Further, because the number of parts is relatively small, this apparatus can be assembled simply.

In this embodiment, the two loading disks are located one around each of two reel spindles concentrically thereof. Alternatively, the loading disks may be located in another position, e.g., concentrically of the cylinder. Or one or more loading disks may be located concentrically of the capstan.

According to the embodiment, partly since the center line of the loading disk is normally in alignment with its axis of rotation, and partly since the loading disk is free from being inclined, the rotating force by the drive gear can be transmitted reliably so that the gear portion of the loading disk is prevented from any damage. Therefore it is possible to obtain a loading mechanism which is high in reliability, gives a long service life and can be assembled easily and efficiently.

Tape Tensioning Mechanism of the Second Embodiment

Figure 22:
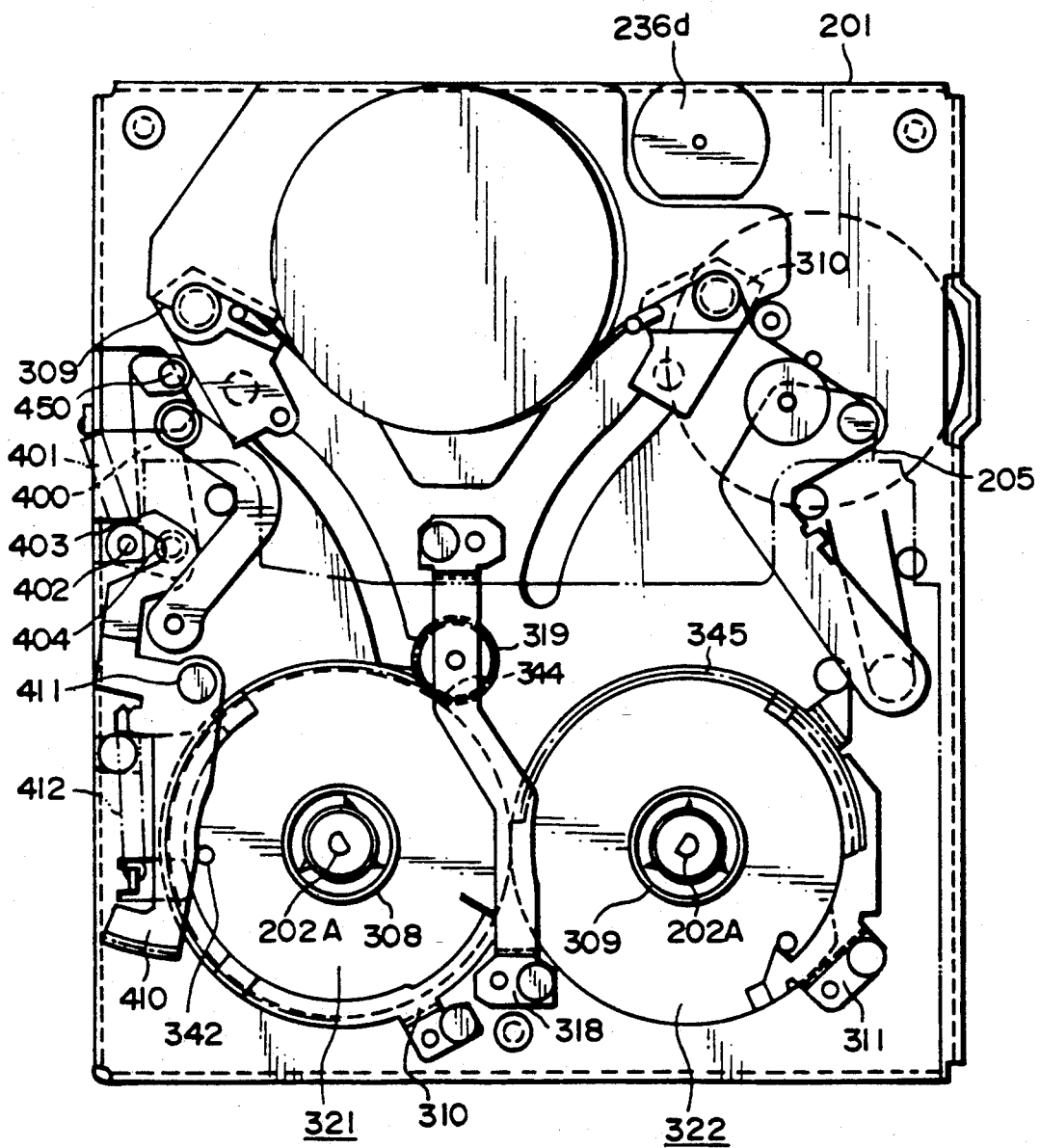
FIG. 22 is a plan view similar to FIG. 15, showing a loading position of the tension arm loading mechanism of the second embodiment.
Figure 23:
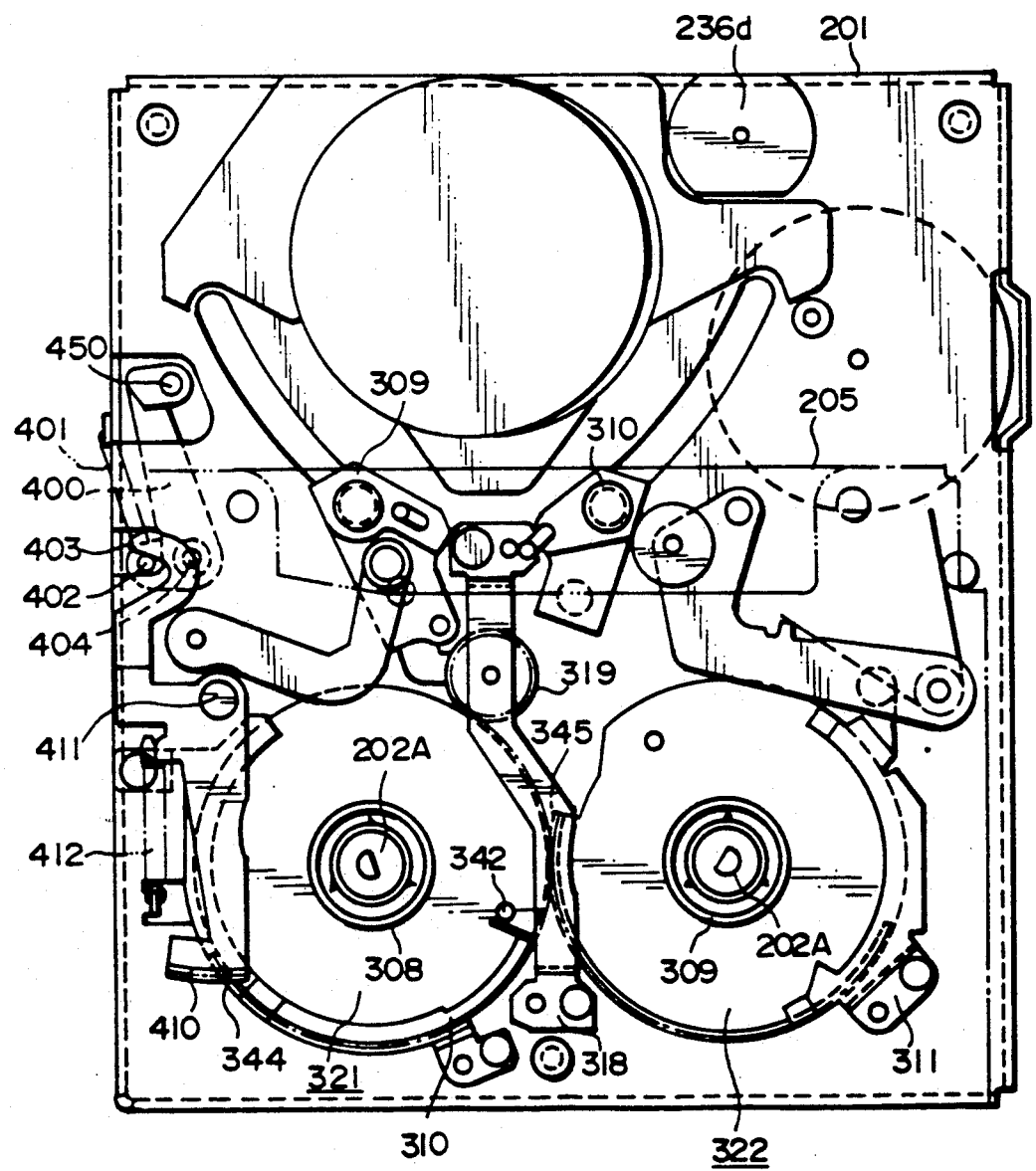
FIG. 23 is a plan view similar to FIG. 22, showing an unloading position of the tension arm.

FIGS. 22 and 23 show a tape tensioning mechanism according to the second embodiment, with which a desired tension is given to the magnetic tape.

A tension arm loading mechanism of this embodiment comprises a tension arm pivotally movable depending on the tension of the magnetic tape, a tension spring normally urging the tension arm toward the magnetic tape, two loading disks each threaded over a part of the respective reel spindle and rotatably mounted on the chassis, a transmission pin mounted on the loading disk, and a transmission arm pivotally mounted on the chassis and pivotally movable by the movement of the transmission pin.

In the tension arm loading mechanism, the transmission pin is moved, in response to the rotation of the loading disk, to cause the transmission arm to pivotally move so that the loading position and the unloading position of the tension arm can be determined, depending on the angle of rotation of the transmission arm.

FIGS. 22 and 23 show the loading position and the unloading position, respectively. In FIGS. 22 and 23, reference numeral 401 designates a tension spring connected at one end to a shaft 402, which is mounted on one end of the tension arm 400, and at the other end to the chassis 201 and normally urges the tension arm 400 clockwise. Further, the shaft 402 is fitted in a hole 403 formed in the chassis 201 so that the tension arm 400 is pivotally movable in the hole 403 about a pivot 404. 410 designates a transmission arm which is pivotally movable about a pivot 411 fixed to the chassis 201; and 412, a spring connected at one end to the chassis 201 and at the other end to one of the transmission arm 410 to normally urge the transmission arm 410 counterclockwise. The one end of the transmission arm 410 is set in a position where the transmission arm 410 is engageable with the shaft 402 on the tension arm 400. The strength of the spring 412 is not only so as to urge the transmission arm 410 counterclockwise, but so as to pivotally move the tension arm 400 counterclockwise against the bias of the tension spring 401, thereby setting to a value enough to push the shaft 402 against the end surface of the hole 403.

As described above, reference numeral 321 designates a leftside loading disk in which a part of the supply side reel spindle 202A is inserted and which is rotatable about the hollow bush 308 fixed to the chassis 201. The leftside loading disk 321 has on its outer edge a gear portion 344 which is meshable with the final-stage gear 319 of a reduction mechanism (not shown) transmitting a driving force from the motor 236d. Further, the leftside loading disk 321 has a transmission pin 342 mounted thereon and engageable with one end of the transmission arm 410.

Likewise, 322 designates a rightside loading disk in which a part of the take-up reel spindle 202A is inserted and which is rotatable about the hollow bush 309 fixed to the chassis 201. The rightside loading disk 322 has on its outer edge a gear portion 345 which is meshable with the gear portion of the leftside loading disk 321, thereby driving the tape drawing members 309, 310 and other parts (drive mechanism is omitted here for clarity). The vertical movement of the leftside loading disk 321 is restricted by the clamp 310 and the holder 318, while the vertical movement of the rightside rotary 322 is restricted by the clamp 311 and the holder 318.

Tape Tensioning Action of the Second Embodiment

The operation of the tape tensioning mechanism will now be described. During unloading the magnetic tape 205, various parts assume their position of FIG. 23. Specifically, partly since the transmission arm 410 is normally urged counterclockwise by the spring 412 and partly since the tension arm 400 is normally urged counterclockwise against the bias of the tension spring 401, the shaft 402 remains stationary in engagement with the hole 403 of the chassis 201.

When the motor 236d rotates as the loading action starts, the leftside loading disk 321 starts rotating counterclockwise via the reduction mechanism and the gear 319. By this action, the transmission pin 342 mounted on the leftside loading disk 321 comes in contact with one end of the transmission arm 410 to pivotally move the transmission arm 410 clockwise against the bias of the spring 412. Further, since the pivotal movement of the tension arm 400 is released by the clockwise angular movement of the transmission arm 410, the tension arm 400 is pivotally moved clockwise under the bias of the tension spring 401 so that a tension pole 450 is exactly balanced with the tension of the magnetic tape 205, thus completing the tape loading action (FIG. 22).

Meanwhile, when the motor 236d rotates as the unloading action starts, the leftside loading disk 321 starts rotating then clockwise via the reduction mechanism and the gear 319. By this action, the transmission pin 342 mounted on the leftside loading disk 321 is removed from the transmission arm 410 so that the restriction to the rotational movement of the transmission arm 410 is released, thus causing the transmission arm 410 to pivotally move counterclockwise under the bias of the spring 412. The tension arm 400 also is pivotally moved counterclockwise against the bias of the tension spring 401 so that the shaft 402 is returned to its position of FIG. 23 where it is in engagement with the hole 403 of the chassis 201, thus completing the unloading action.

According to this embodiment, since the number of parts of drive transmission means of the tension arm loading mechanism can be reduced, it is possible to reduce the cost of production of the mechanism. Since the required dimensions between the individual parts can be obtained easily, it is possible to increase the efficiency of transmitting the driving force so that a highly reliable mechanism can be achieved. Yet this apparatus requires only little space for various parts and therefore can be manufactured in a thin and compact size.

Reel Brake Mechanism of the Second Embodiment

FIGS. 24 through 28 show a reel brake mechanism according to the second embodiment, in which a desired braking action is given to the reel spindles.

Figure 24:
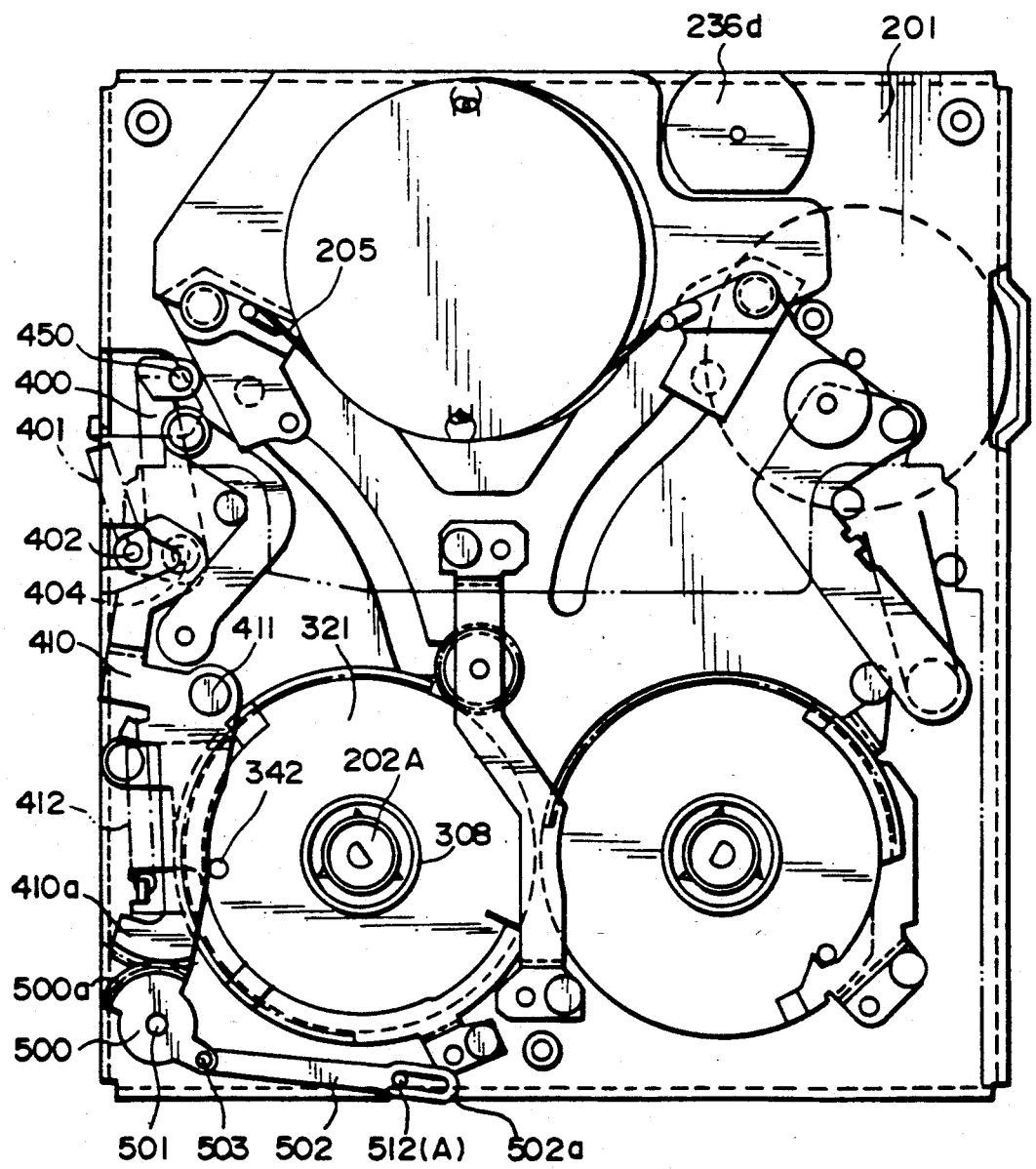
FIG. 24 is a plan view showing the structure of a reel spindle braking mechanism of the second embodiment during recording and reproducing.
Figure 25:
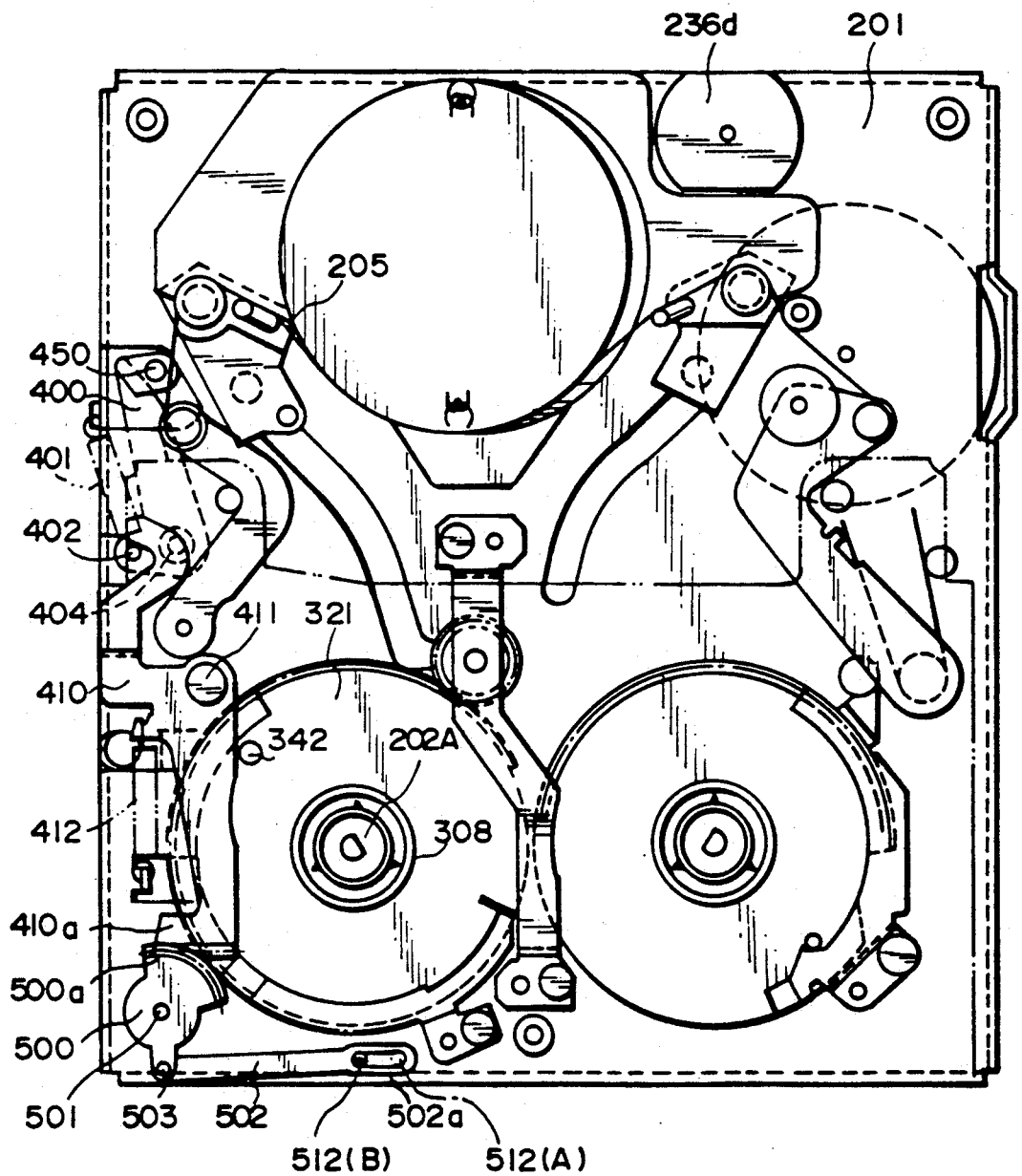
FIG. 25 is a view similar to FIG. 24, showing the reel spindle braking mechanism during high-speed forward feeding and high-speed rewinding.

FIG. 24 shows the recording and reproducing position of the magnetic recording and reproducing apparatus; FIG. 25, the high-speed feeding and high-speed rewinding position of the apparatus; and FIG. 26, the tape unloading position of the apparatus.

Figure 26:
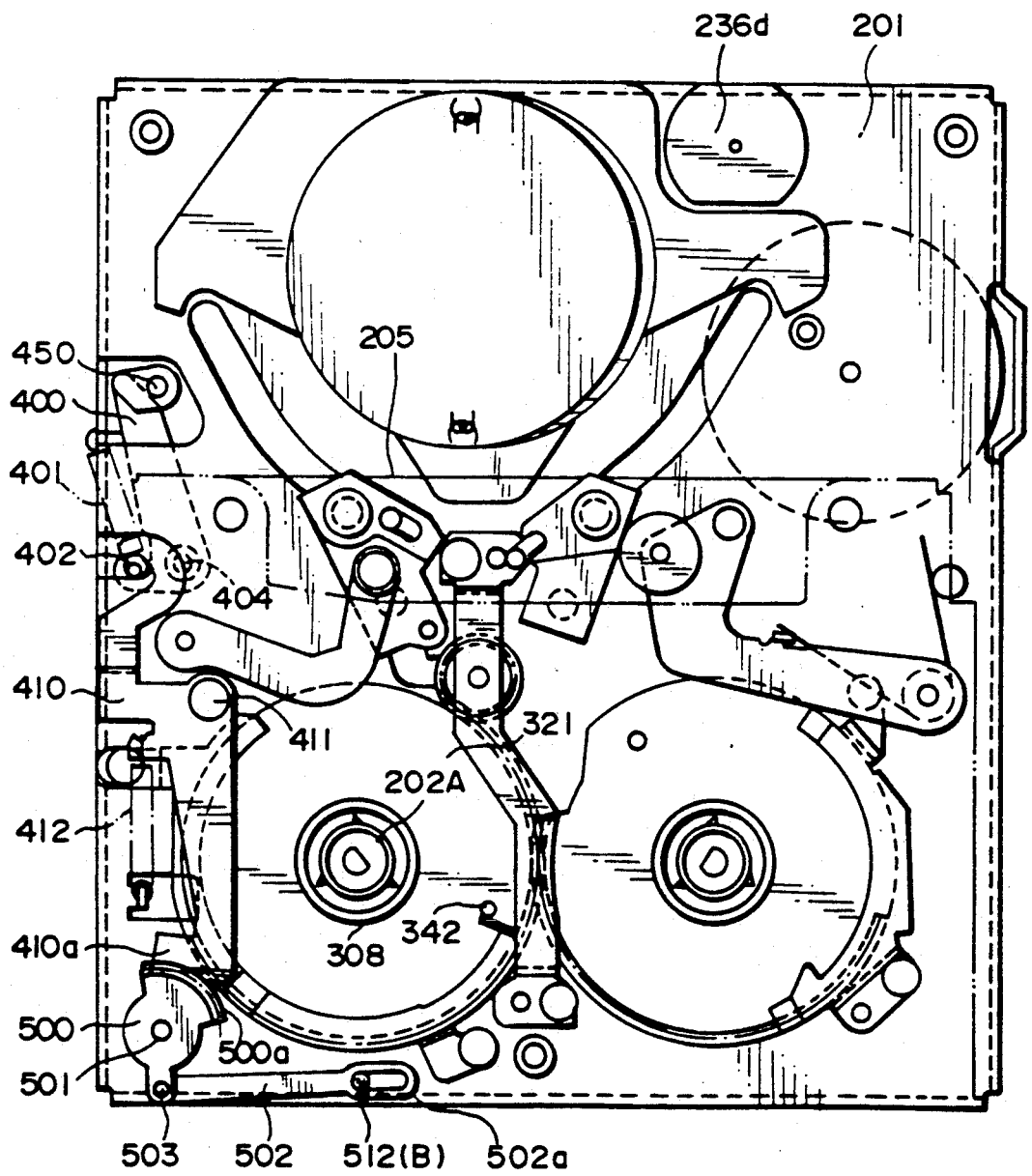
FIG. 26 is a view similar to FIG. 24, showing the reel spindle braking mechanism during unloading.

In FIGS. 24 through 26, reference numeral 321 designates a loading disk driven by the tape loading motor 236d (via various non-illustrated parts of the transmission system) and having in its center an annular bush 308 in which a part of the chassis 201 is inserted and which is disposed around the supply side reel spindle 202A coaxially thereof; 342, a transmission pin mounted on the loading disk 321; 410, a transmission arm pivotally supported on the deck base 201 by a pivot 411 and normally urged by a spring 412 to pivotally move counterclockwise and engageable with the transmission pin 342, the transmission arm 410 having at one end a gear portion 410a and being engageable at the other end with the tension arm 400; 500, a driving lever pivotally supported on the deck base 201 by a pivot 501 and having on its one end gear portion 500a meshable with the gear portion 410a of the transmission arm 410; and 502, a driving rod connected at one end to a driving lever 500 via a connecting pin 503 to constitute a toggle mechanism and having in its other end an elongated hole 502a.

Figure 27:
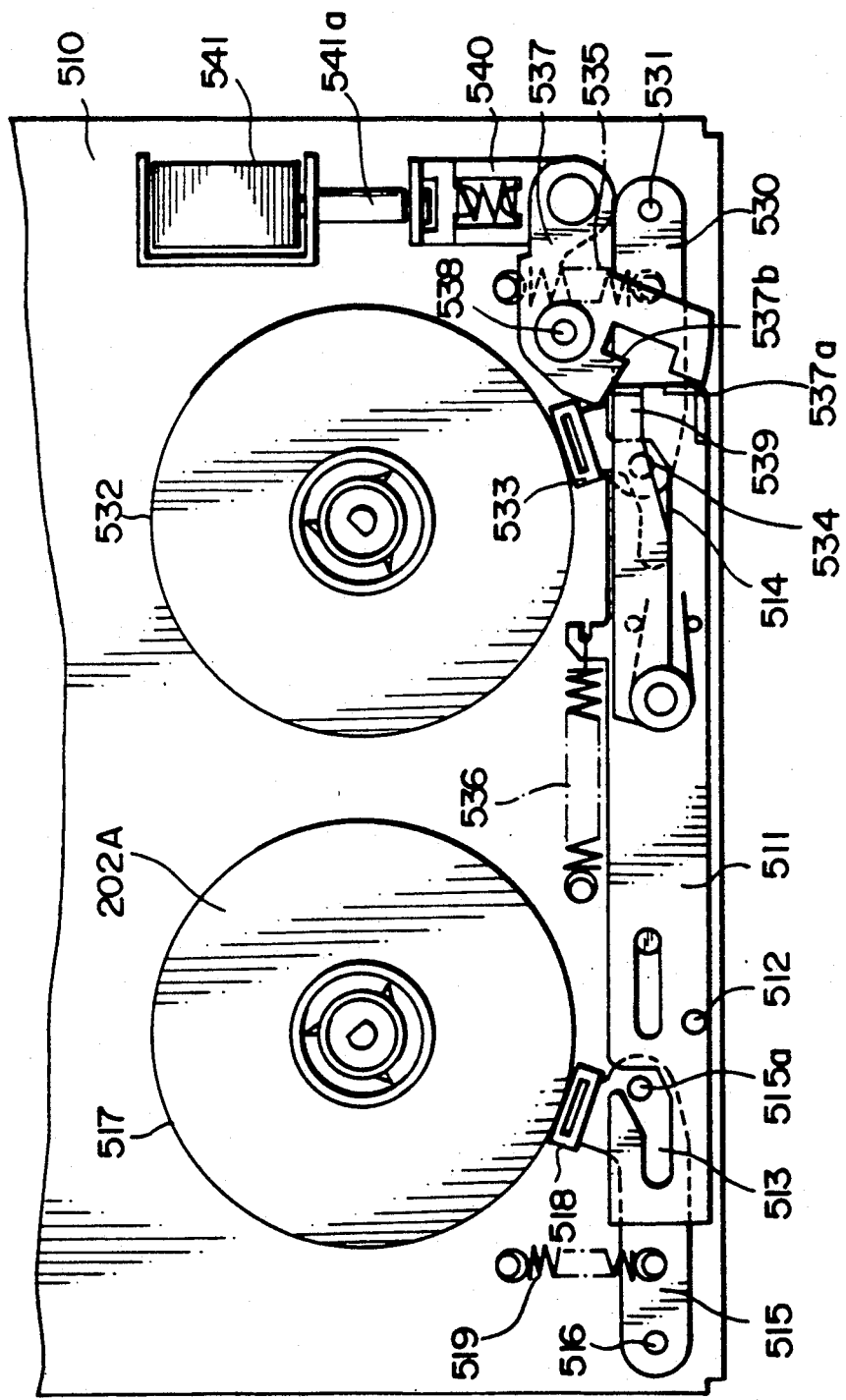
FIGS. 27 and 28 show the reel spindle braking mechanism of the second embodiment at the time of braking and at the time of brake releasing, respectively.
Figure 28:
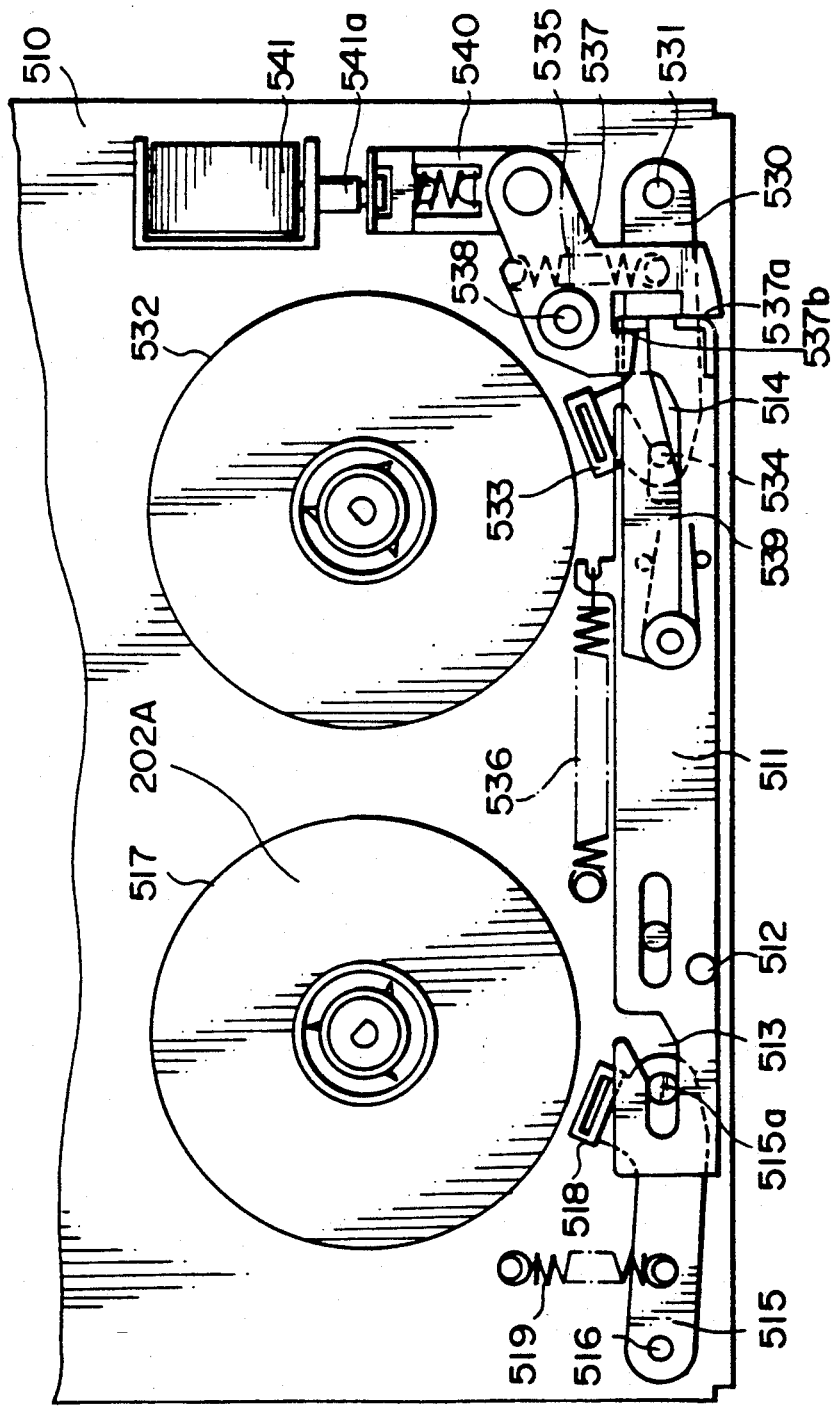

FIG. 27 shows the braking position of the reel brake mechanism, and FIG. 28 shows the brake releasing position of the reel brake mechanism. In FIGS. 27 and 28, reference numeral 510 designates a subchassis secured to the lower part of the deck base 201 such as by screws; 511, a slider having a locking pin 512 engageable with the elongated hole 502a of the driving rod 502 and at opposite ends first and second cam portions 513, 514 and movable back and forth horizontally; 515, a first braking lever pivotally supported on the subchassis 510 by a pivot 516 and having a brake shoe 518 engageable with a brake drum 517 of the supply side reel spindle 202A, the first braking lever 515 having also a locking pin 515a engageable with the first cam portion 513 of the slider 511; 519, a spring normally urging the first braking lever 515 in such a direction as to bring the brake shoe 518 against the supply side brake drum 517; 530, a second braking lever pivotally supported on the subchassis 510 by a pivot 531 and having a brake shoe 533 engageable with a take-up side brake drum 532, the second braking lever 530 having also a locking pin 534 engageable with the cam portion 514 of the slider 511; 535, a spring normally urging the second braking lever 530 in such a direction as to bring the brake shoe 533 against the take-up brake drum 532; 536, a spring normally urging the slider 511 leftwardly in FIGS. 27 and 28; and 537, a lock lever pivotally supported on the subchassis 510 by a pivot 538 and having at one end a contact portion 537a engageable with the slider 511 and a locking portion 537b engageable with a hook 539 mounted on the slider 511. Connected to the other end of the lock lever 537 is a limiter 540, which serves as a connecting member, compressable longitudinally and normally urged to stretch longitudinally. 541 designates a latching type solenoid which has therein an attracting and holding magnet, an iron core 541a of the solenoid 541 being connected to the limiter 540.

Reel Braking Action of the Second Embodiment

The operation of the reel brake mechanism will now be described. In the tape unloading position of FIG. 26, the tape loading action is started as the tape loading motor 236d is driven to rotate so that the loading disk 321 is rotated counterclockwise to assume the position of FIG. 25. At that time, the locking pin 512 of the slider 511 is located at the B position. And the transmission arm 410 is normally urged counterclockwise by the spring 412 to press the locking portion 402 of the tension arm 400, thereby urging the tension arm 400 counterclockwise to bring the tension pole 450 away from the magnetic tape 205. Further, when the loading disk 321 is rotated to assume the position of FIG. 24, the transmission pin 342 mounted on the loading disk 321 comes in contact with the transmission arm 410 to cause the transmission arm 410 to rotate clockwise. The transmission arm 410 is thereby spaced apart from the tension arm 400 so that the tension arm 400 is pivotally moved under the bias of the spring 401 to cause the tension pole 450 to contact the magnetic tape 205.

At the same time, the driving lever 500 meshing the gear portion 410a mounted at the end of the transmission arm 410 is pivotally moved counterclockwise to cause the slider 511 to move rightwardly via the driving rod 502 as shown in FIGS. 27 and 28 so that the two braking levers 515, 530 engaging the two cam portions 513, 514 of the slider 511 are pivotally moved, in response to the movement of the slider 511, in such a direction as to set away from the supply side brake drum 517 and the take-up side brake drum 532, respectively. This movement of the slider 511 causes the lock lever 537 to pivotally move so that the iron core 541a is pushed into the solenoid 541 via the limiter 540 and is attracted and held there by the action of the built-in magnet. At that time, the hook 539 mounted on the slider 511 comes in engagement with the locking portion 537b of the lock lever 537 to prevent the leftward movement of the slider 511. As a result, the brake shoes 518, 533 mounted on the respective braking levers 515, 530 remain spaced from the two brake drums 517, 532. Shifting from the position of FIG. 25 to the position of FIG. 24, the releasing action of the reel brake mechanism has thus performed.

The manner in which the reel spindle brake and the tension pole 450 are set apart from the reel spindle during high-speed feeding or high-speed rewinding. In the position of FIG. 24, when the tape loading motor 236d is driven to rotate so that the loading disk 321 is rotated clockwise so that the transmission pin 342 is moved so as to set apart from the transmission arm 410. The transmission arm 410 is pivotally moved counterclockwise under the bias of the spring 412 to press the locking portion 402 of the tension arm 400, thereby retaining the tension pole 450 as set apart from the magnetic tape 205.

Concurrently, the transmission arm 410 causes the driving lever 500 to pivotally move clockwise to thereby move the driving rod 502 leftwardly. At this time, since the slider 511 is attracted and thus retained by the solenoid 541, the contact portion 512 stays at the A position of FIG. 25 without moving. As the loading disk 321 is turned to the position of FIG. 25 to assume its high-speed feeding or high-speed rewinding position so that the apparatus thus enters the high-speed feeding action or the high-speed rewinding action. Accordingly, when a braking signal is generated as it has reached a leading or trailing end of the tape or a predetermined tape position, the attracting force of the solenoid 541 is canceled by applying a predetermined voltage to the solenoid 541. The lock lever 537 is pivotally moved clockwise under the bias of the spring 536 to move the slider 511 leftwardly so the brake shoes 518, 533 of the braking levers 515, 530 engaging the cam portions 513, 514 of the slider 511 come in contact with the supply side brake drum 517 and the take-up side brake drum 532, respectively, to slow down or stop their rotation.

The recording and recording actions of this apparatus are identical with those of the prior art apparatus. In this embodiment, for retaining the slider 511 in the brake releasing position, the solenoid 541 of the latching type having a magnet is used. Alternatively, the solenoid 541 may be of normally conducting type having no magnet for retaining. In that case, when it is shifted from the recording/recording mode of FIG. 24 to the high-speed feeding/high-speed rewinding mode, a predetermined voltage is applied to the solenoid 541 to attract its iron core 541a to thereby prevent the slider 511 from moving. Then, it is shifted to the high-speed feeding/high-speed rewinding mode, whereupon upon receipt of a braking signal, the voltage applied to the solenoid 541 is cut off to break the attracting action of the solenoid 541 so that the slider 511 is allowed to move.

According to this invention, without using any worm gear or worm wheel taking a long actuation time as conventional, it is possible to perform the braking action or the brake releasing action quickly, during the high-speed feeding or high-speed rewinding, by the action of the slider generally moving rectilinearly. Further, since the transmission arm and the slider are interconnected via a toggle mechanism, the driving load of the loading disk can be minimized. Still further, since the drive for the tension arm is also used for the braking operation, a small-sized apparatus can be realized.

Pinch Roller Drive Mechanism of the Second Embodiment

Figure 29:
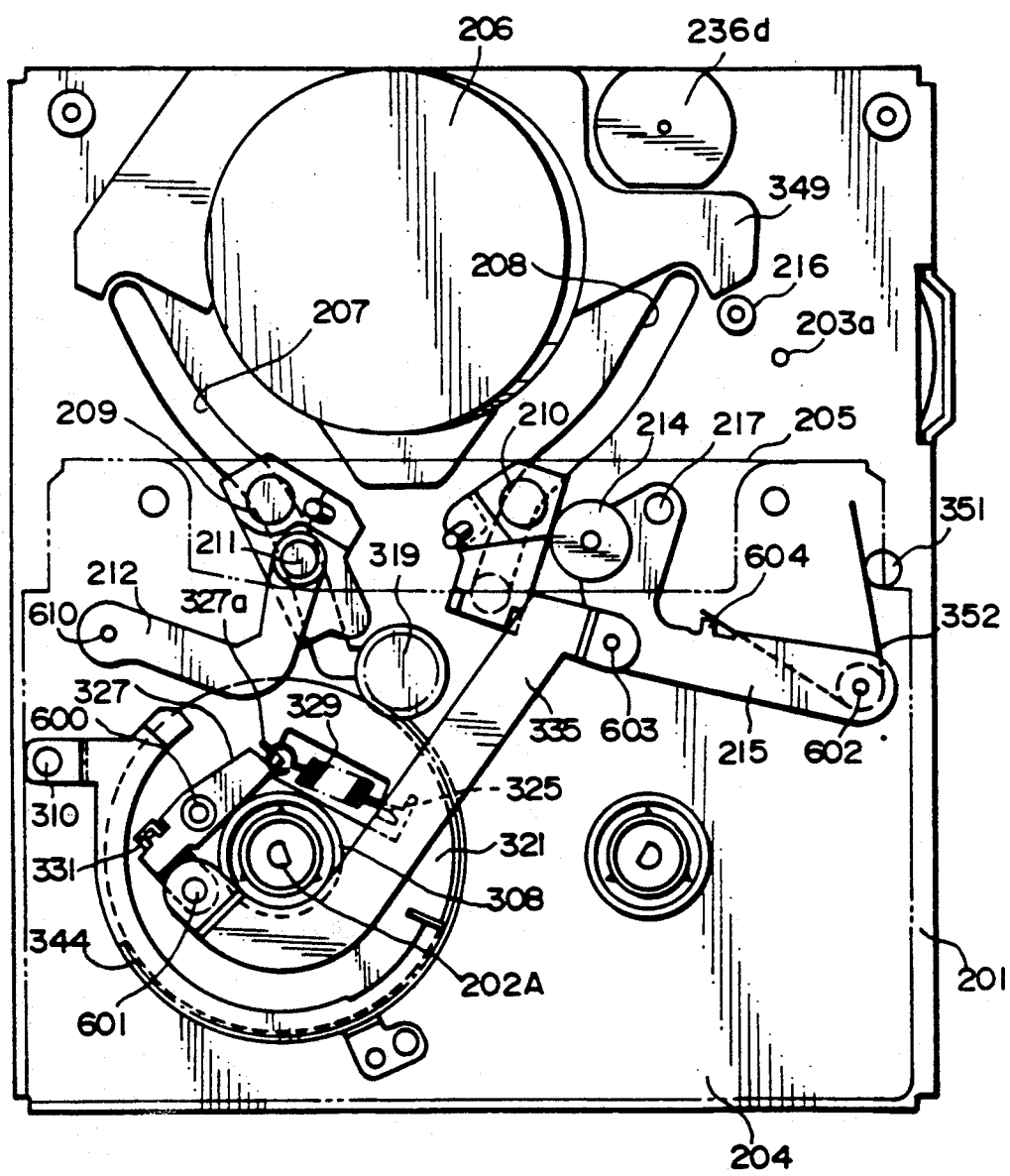
FIG. 29 is a plan view showing the structure of a pinch roller driving mechanism of the second embodiment during unloading.
Figure 30:
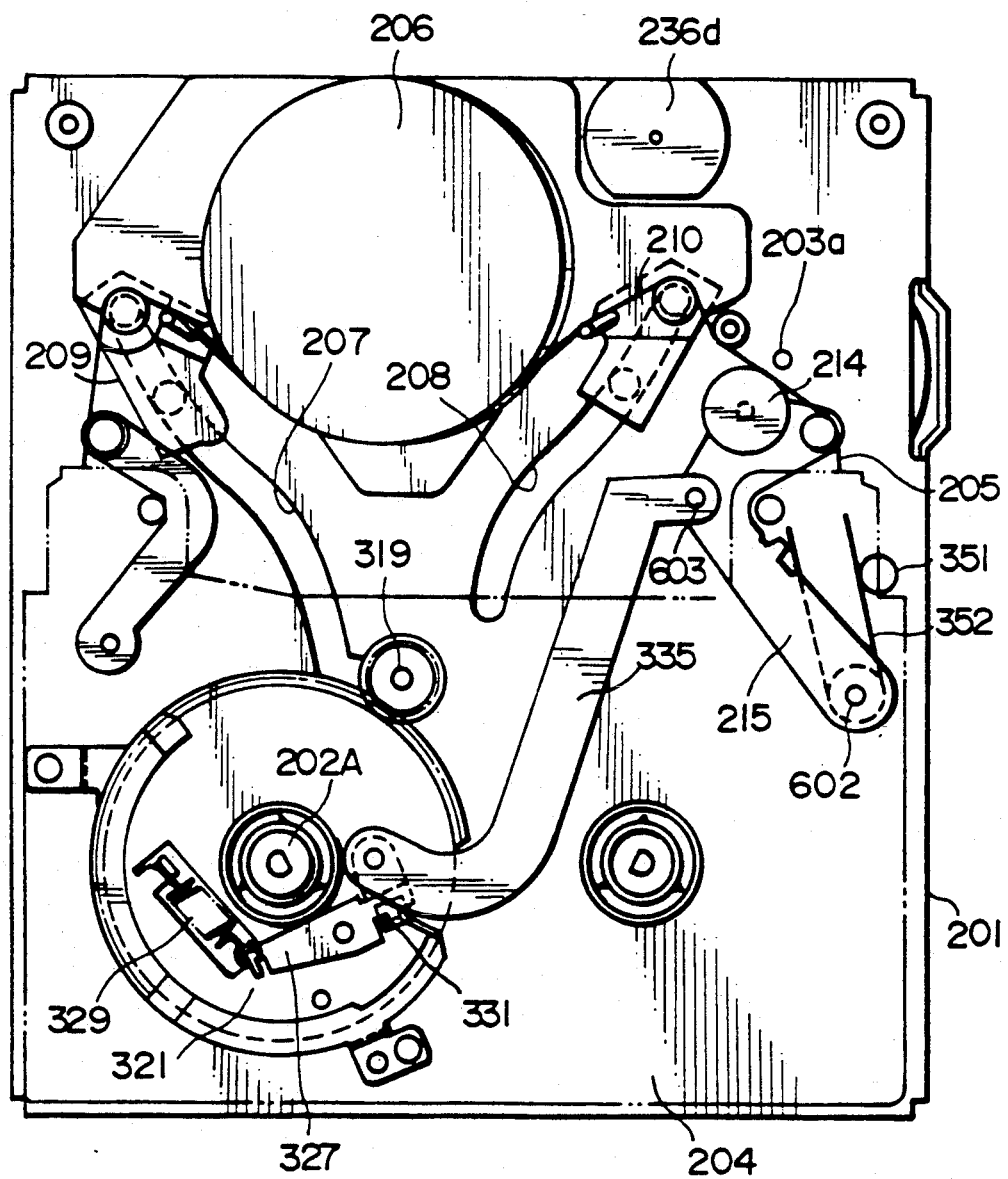
FIG. 30 is a view similar to FIG. 29, showing the pinch roller driving mechanism during high-speed forward feeding and high-speed rewinding.
Figure 31:
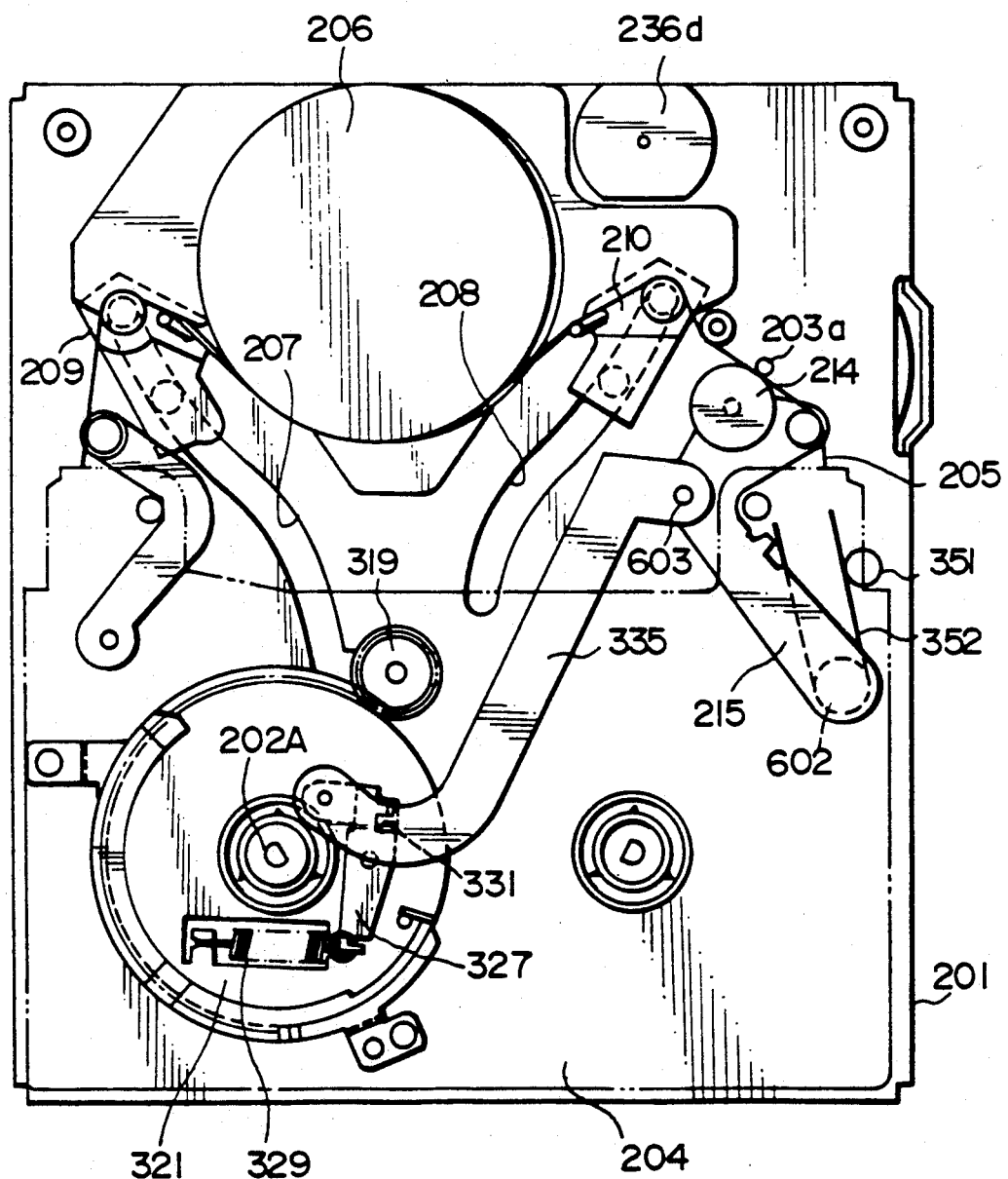
FIG. 31 is a view similar to FIG. 30, showing the pinch roller driving mechanism during loading.

FIGS. 29 through 31 show a pinch roller drive mechanism according to the second embodiment.

In FIG. 29, reference numeral 321 designates a loading disk; 308, a bush of the loading disk 321; 344, a gear formed on an outer periphery of the loading disk 321; 325, a cutout formed in the loading disk 321; 331, a locking portion formed on the loading disk 321; 600, a shaft mounted on the loading disk 321; 327, a lever pivotally movable about the shaft 600; 327a, a hook formed on one end of the lever 327; 601, a shaft formed on the other end of the lever 327; 329, spring connected at one end to the cutout 325 and at the other end to the hook 327a; 214, a pinch roller; 217, a take-up side tape guide; 215, a pinch arm provided with the take-up side tape guide 217 and the pinch roller 214; 602, the axis of turning of the pinch arm 215; 603, a shaft mounted on one end of the pinch arm 215; 335, a link rod constituting a toggle mechanism jointly with the lever 327; 351, a stop; 604, a hook formed on the pinch arm 215; 352, a torsion spring connected between the stop 351 and the hook 604; 203a, a capstan shaft; 216, a take-up tape guide; 206, a rotary head drum; 349, a drum base to which the rotary head drum 206 is attached; 209, 210, a pair of tape drawing members; 211, a supply side tape guide; 212, a tape guide arm on which the supply side tape guide 211 is mounted; 610, the axis of turning of the tape guide arm 212; 207, 208, guide grooves of the respective tape drawing members 209, 210; 236d, a loading motor; 310, a clamp of the loading disk 321; 319, a gear meshable with the gear portion 344 of the loading disk 321; 202A, a supply side reel spindle; 201, a chassis; 204, a tape cassette; 205, a magnetic tape.

Pinch Roller Driving Action of the Second Embodiment

The position of FIG. 29 is an unloading position in which a pair of the tape drawing members 209, 210, the tape guide arm 212 and the pinch arm 215 have been unloaded and in which the magnetic tape 205 has not been drawn from the tape cassette 204 placed on the chassis 201.

Further, since the lever 327 is normally urged clockwise about the shaft 600 by the biasing force of the spring 329 but is at one end in engagement with the locking portion 331, the lever 327 remains stationary.

Now, as the loading motor 236d rotates, the pair of tape drawing members 209, 210 and the tape guide arm 212 are driven by the above-described drive mechanism so that the magnetic tape 205 is drawn from the tape cassette 205. With continued rotation of the loading motor 236d, its driving force is transmitted to the gear 319 by the transmission mechanism to cause the loading disk 321 to rotate counterclockwise about the bush 308.

Then as it proceeds to the position of FIG. 30, the lever 327 and the link rod 335 are pivotally moved in response to the turning of the loading disk 321. By the action of the link rod 335, the pinch arm 215 is pivotally moved clockwise about its axis of turning 602 against the bias of the torsion spring 352. In the position of FIG. 30, the pinch roller 214 is not yet in contact with the capstan shaft 203a, and the toggle mechanism composed of the lever 327 and the link rod 335 also does not come over the point (hereinafter called "inversion point") where the acting direction of force is inverted, with the lever 327 remaining in engagement with the locking portion 331.

Subsequently, in FIG. 31 where the loading disk 321 is turned more than FIG. 30, the lever 327 and the link rod 335 are driven, in response to the movement of the loading disk 321, so that the pinch roller 214 comes in contact with the capstan shaft 203a. At that time point, the lever 327 and the link rod 335 constituting the toggle mechanism has not yet come over the inversion point while one end of the lever 327 is still kept in contact with the locking portion 331. In addition, as the loading disk 321 is turned, the pinch arm 215 can no more pivotally moved while the lever 327 continues rotating. Therefore, the toggle mechanism formed of the lever 327 and the link rod 335 comes over the inversion point, whereupon the lever 327 is pivotally moved counterclockwise about the shaft 600. Then the lever 327 comes out of engagement with the locking portion 331 to expand the spring 329. This expansion of the spring 329 creates a restoring force as a pressing force to be applied to the capstan shaft 203a of the pinch roller 214.

According to this embodiment, partly since the loading disk serves as a drive source and partly since the link mechanism is provided on the loading disk, it is possible to increase the degree of freedom in arranging the components. Further, because of the simple link mechanism, a thin, small-sized deck can be achieved.

Structure of Rotary Head Drum

Figure 32:
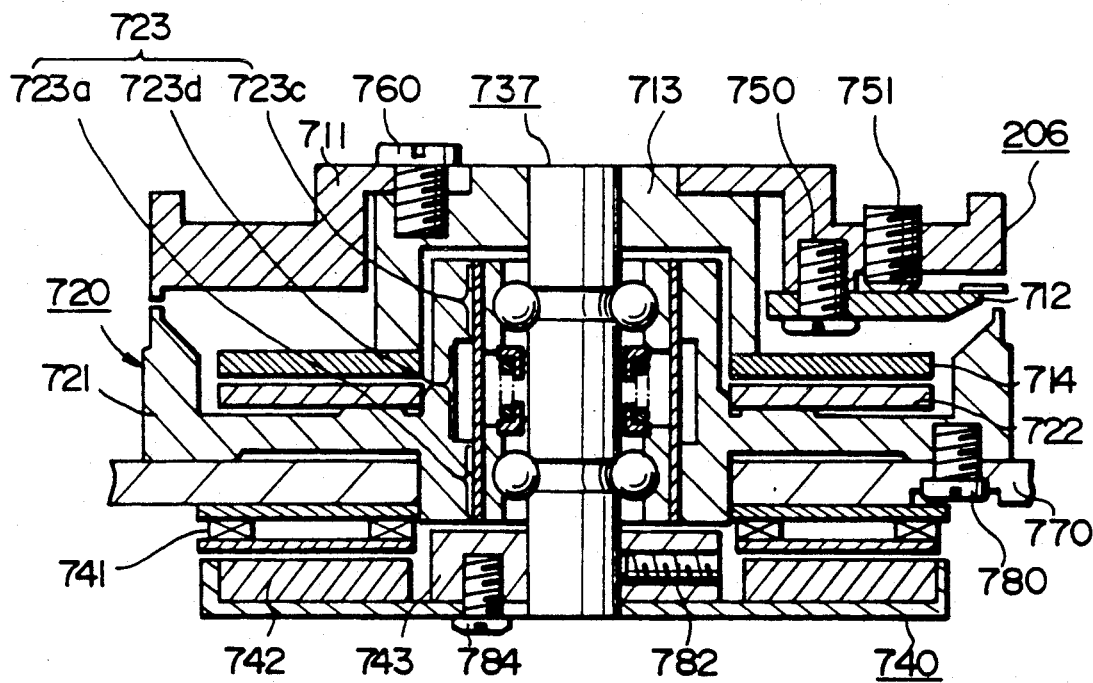
FIG. 32 is a cross-sectional of a rotary drum used in this invention and supporting the magnetic head.
Figure 33:
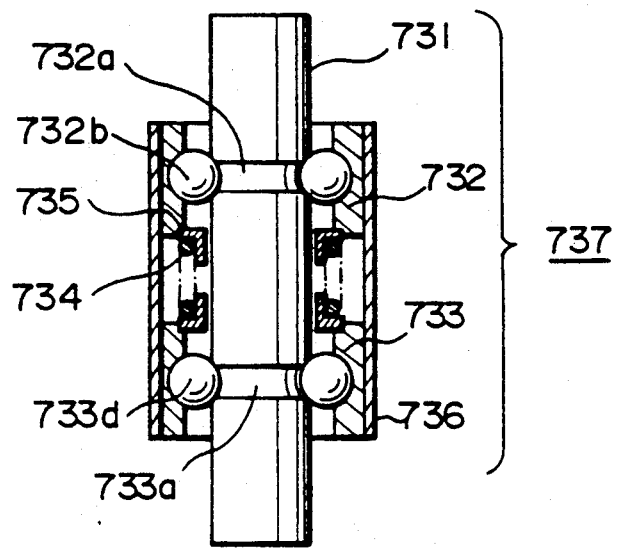
FIG. 33 is a cross-sectional view of a sleeved bearing used in the rotary drum of FIG. 32 and attached to a shaft as a unit.
Figure 34:
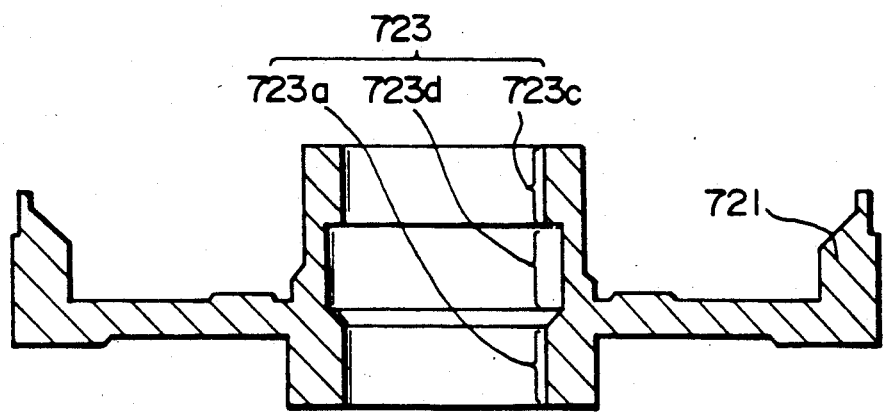
FIG. 34 is a cross-sectional view of a fixed drum used in the invention.

FIGS. 32 through 34 show a rotary drum carrying a magnetic head to be used in the embodiments of this invention.

In FIGS. 32 through 34, reference numeral 206 designates a rotary drum unit; 711, a rotary drum; 712, a magnetic head; 713, a flange; and 714, a rotation side rotary transformer.

720 designates a fixed drum unit; 721, a fixed drum; 722, a fixed side rotary transformer; 723, a bearing housing mounted on the fixed drum 721; 723a, 723c, press-in surfaces; and 723d, a step-like recess. Further, 737 designates a sleeved bearing; and 736, a cylindrical sleeve. Practically, as shown in FIG. 33, for the structure of the sleeved bearing 737, two outer laces 732, 733 of the same outside diameter are mounted on the shaft 731 having two inner lace surfaces 732a, 733a. Further, with prepressure by the spring 734, the cylindrical sleeve 736 is fixed on the outer periphery of the outer laces 732, 733. With this arrangement, the deviation of the outer periphery of the sleeve 736 with respect to the shaft 731 a well as the degree of cylinder of the outer periphery of the sleeve 736 were regulated with high precision.

The order of assembling procedures of the rotary drum structure will now be described.

As shown in FIG. 32, the sleeved bearing 737 is forced in the bearing housing 723, which is formed on the fixed drum 721, from the side of the rotary drum 711. At that time, the bearing housing 723 is composed of the step-like recess 723d having a diameter larger than the outer diameter of the cylindrical sleeve 736, and the press-in surfaces 723a, 723c defining diameter portions smaller than the outer diameter of the sleeve 736 mounted on opposite sides of the step-like recess 723d. Thus, the relation between the bearing housing and the sleeved bearing needs to satisfy the following:

Diameter of the step-like recess 723d > outside diameter of sleeve 736 > diameter of press-in surfaces 723a, 723c.

As it satisfies this conditions, the sleeved bearing 737 is forced in and supported on the outer peripheral surface of the sleeve 736 at two press-in surfaces 723a, 723c of the housing 723.

Partly since by using the cylindrical sleeve 736, the press-in length can be much longer, and partly since the bearing housing 723 is provided with the step-like recess 723d is formed at midportion between the press-in surface 723a and the force surface 723c, it is possible to maintain the degree of cylinder of the press-in surfaces 723a, 723c at high precision, compared to the case in the absence of the step-like recess 723d.

Generally, in press-in or shrinkage fit, the longer the portion on which the sleeve is to be fitted by press-in or shrinkage fit, the higher the degree of precision of the press-in or shrinkage fit can be achieved. Thus, press-in and shrinkage fit is very influenced by the degree of precision of the bearing housing 723. In this embodiment, since the sleeve portion of the sleeved bearing 737 is supported at two press-in surfaces 723a, 723c of the bearing housing 723, it is possible to take a long press-in portion. Besides, since the degree of precision of the bearing housing 723, the fixed drum 721 can be attached to the shaft 731 perpendicularly to its attachment surface with high precision.

In this illustrated embodiment, the sleeved bearing 737 is pressed into the bearing housing 723. However, this invention should by no means be limited to this specific example; for example, it may be shrinkage fit.

Then, the fixed side rotary transformer 722 is attached on the side of the fixed drum 721, while the rotation side rotary transformer is attached to the flange 713. The shaft 731 is fixed to the flange 713. Subsequently, after the magnetic head 712 has been fixed to the lower surface of the rotary drum 711 at a predetermined portion thereof by a screw 750, the rotary drum 711 is fixed to the flange 713 by a screw 760. In addition, the stator 741 is fixed to the fixed drum 721 on the rear side of a chassis 770 by a screw 780, and an end ring 743 is fixed to the shaft 731 by a screw 782, and a motor unit 740 around which a rotor 742 is disposed is mounted on the end ring 743 by a screw 784.

For another embodiment, if the sleeved bearing 737 is to be pressed in from the side of the rotary drum 711, for example, the step-like recess 723d of the bearing housing 723 may be tapered on the side of the motor unit 740. Alternatively, if the sleeved bearing 737 is to be pressed in from the side of the motor unit 740, the taper portion of the step-like recess 723d of FIG. 34 is located on the side of the rotary drum 711 so that the sleeved bearing can be pressed in without difficulty. If the step-like recess 723d is filled with an adhesive, removal of the shaft 731 can be prevented exactly.

In the sleeved bearing in this embodiment, a spring is used to prepress the sleeved bearing. In an alternative form, however, with prepressure having applied to a predetermined position, the sleeved bearing 737 in which the outer laces 732, 733 are fixed to the cylindrical sleeve 736 may be used.

In this embodiment, having used the sleeved bearing, even if the distance between the upper and lower outer laces is shortened, the press-in surfaces are formed at least two portions, i.e. upper and lower portions, and as a result, the press-in surfaces may be long so that with the sleeved bearing remaining its vertical position in the rotary drum structure with high precision, the rotary drum can be reduced to a thin and compact form. In production of the rotary drum structure, since only the press-in step is needed and sufficient, namely, since the attaching step is unnecessary, it is possible to minimize the number of manufacturing steps. Further, since there is free from any inclination of the shaft, it is possible to control the gap between the rotation side and the fixed side of the rotary transformer without difficulty.

Still further, since the sleeved bearing is supported at two portions of the bearing housing of the fixed drum by press-in or shrinkage fit, the shaft can be kept in its vertical posture with respect to the attachment surface of the fixed drum with high precision. Therefore, the plane of rotation of the magnetic head is free from being inclined so that tracks recorded on the magnetic tape can be traced accurately.

What is claimed is:

1. A magnetic recording and reproducing apparatus of the type in which a magnetic tape is to be drawn from a tape cassette and to be introduced onto a magnetic head drum to define a predetermined tape traveling path, said apparatus comprising:

(a) a pair of rotary reel spindles;
(b) at least one loading disk disposed around said rotary reel spindles without engagement therewith, said loading disk having a driven gear along its outer peripheral edge;
(c) a tape drawing member movable for drawing the magnetic tape from the tape cassette as guided by a guide groove in a chassis of the apparatus and then introducing the drawn magnetic tape onto the magnetic head drum;
(d) a link connected at opposite ends to said loading disk and said tape drawing member, respective to the drawing movement of said tape drawing member; and
(e) driving means for giving a rotating force to said loading disk.

2. A magnetic recording and reproducing apparatus according to claim 1, in which said loading disk is disposed around each of said reel spindles.

3. A magnetic recording and reproducing apparatus according to claim 1, in which said loading disk is disposed coaxially of said one of said reel spindles.

4. A magnetic recording and reproducing apparatus according to claim 1, in which said loading disk is disposed eccentrically of said one of said reel spindles.

5. A magnetic recording and reproducing apparatus according to claim 1, in which said loading disk is in the form of a ring rotatably supported at its inner peripheral edge by a bush fixed to a peripheral edge of said reel spindle and at its outer peripheral edge by a retainer fixed to the chassis of the apparatus.

6. A magnetic recording and reproducing apparatus according to claim 5, in which said bush includes a step portion fixed to a chassis and having an upper surface supporting the inner peripheral edge of said loading disk and an outer peripheral surface engaging the inner peripheral surface of said loading disk, said retainer including a contact portion fixed to the chassis and engaging an upper surface of the outer peripheral edge of said loading disk at a plurality of positions thereof so as to keep the height of the loading disk above the chassis, whereby said loading disk is supported by the outer peripheral surface of said step portion of said bush in such a manner that the center axis of said loading disk is aligned with the axis of rotation of said loading disk, and whereby the axis of said loading disk is supported by said contact portion of said retainer and the upper surface of said step portion of said bush in such a manner that said loading disk is rotatable in a constant posture.

7. A magnetic recording and reproducing apparatus according to claim 5, in which said loading disk has a contact portion while said retainer has a locking portion, whereby said loading disk in the tape loading position is positioned by the reaction from said tape drawing member in such a position that said contact portion engages said locking portion.

8. A magnetic recording and reproducing apparatus according to claim 1, further comprising a tape guide arm connected to said link and rotatably supported on the chassis of the apparatus, and
a tape guide carried by said tape guide arm,
whereby said tape guide can be correctly positioned with respect to the magnetic tape simultaneously with the tape loading by said tape drawing member.

9. A magnetic recording and reproducing apparatus according to claim 1, in which one end of said link is engageable with both a first cam groove in said loading disk and a second cam groove in the chassis of the apparatus.

10. A magnetic recording and reproducing apparatus according to claim 1, further comprising:
   (a) a tension pole engageable with the magnetic tape for giving a desired tension to the magnetic tape;
   (b) a tension arm supporting said tension pole;
   (c) a tension spring for giving a constant biasing force to said tension arm; and
   (d) a tension arm liking means for linking said tension arm with said loading disk to restrict and release said tension arm while said loading disk is in rotation.

11. A magnetic recording and reproducing apparatus according to claim 10, in which said tension arm linking means includes a transmission arm engageable with a transmission pin on said loading disk for restricting said tension arm against the bias of said tension spring.

12. A magnetic recording and reproducing apparatus according to claim 1, further comprising:
   (a) a brake member for giving a braking force to said reel spindles;
   (b) a brake spring for causing said brake member to brake said reel spindles with a desired braking force; and
   (c) a slider for restricting said brake member to its inoperative position, said slider being responsive to the rotation of said loading disk to be driven so that said loading disk may assume its loading position while being braked.

13. A magnetic recording and reproducing apparatus according to claim 12, in which the driving force for said slider is derived from said transmission arm which drives said tension arm by said loading disk.

14. A magnetic recording and reproducing apparatus according to claim 1, further comprising:
   (a) a fixed capstan and a movable pinch roller for clamping therebetween the magnetic tape to move it at a constant speed; and
   (b) a pinch arm pivotally mounted on the chassis and supporting said pinch roller, said pinch arm being connected to said link, which moves said tape drawing member by said loading disk, so that the engagement and disengagement of said pinch roller toward may be controlled concurrently with the operation of said loading disk.

15. A magnetic recording and reproducing apparatus according to claim 1, further comprising a rotary drum unit which includes:
   (a) a rotary drum supporting a magnetic head for recording and reproducing signals to and from the magnetic tape;
   (b) a fixed drum for guiding the magnetic tape, said fixed drum having in its inner peripheral surface a step-like recess dividing the inner peripheral surface into a pair of force-in surfaces;
   (c) a rotary shaft fixed to said rotary drum and having an inner race surface;
   (d) an outer race rotatably joined with said shaft and having a built-in steel ball; and
   (e) a cylindrical sleeve fixed to said outer race, said sleeve being forced in said fixed drum so as to be pressed against said pair of force-in surfaces.

16. A magnetic recording and reproducing apparatus of the type in which a magnetic tape is to be drawn from a tape cassette and to be introduced onto a magnetic head drum to define a predetermined tape traveling path, said apparatus comprising:
   (a) a pair of rotary reel spindles;
   (b) at least one loading disk disposed around said rotary reel spindles without engagement therewith, said loading disk having a driven gear along its outer peripheral edge;
   (c) a tape drawing member movable for drawing the magnetic tape from the tape cassette as guided by a guide groove in a chassis of the apparatus and then introducing the drawn magnetic tape onto the magnetic head drum;
   (d) a link connected at opposite ends to said loading disk and said tape drawing member, respectively, for converting the rotation of said loading disk to the drawing movement of said tape drawing member, said link being fixedly positioned with respect to said loading disk in such a manner that when loading the magnetic tape, the direction of reaction acting on said loading disk is displaced beyond the center of said loading disk during loading and that the reaction acts in the direction of holding said loading disk in its loading position by the reaction from said tape drawing member; and
   (e) driving means for giving a rotating force to said loading disk.

17. A magnetic recording and reproducing apparatus of the type in which a magnetic tape is to be drawn from a tape cassette and to be introduced onto a magnetic head drum to define a predetermined tape traveling path, said apparatus comprising:
   (a) a pair of rotary reel spindles;
   (b) at least a pair of loading disks disposed around said rotary reel spindles without engagement therewith, each of said loading disks having a driven gear along its outer peripheral edge;
   (c) a tape drawing member movable for drawing the magnetic tape from the tape cassette as guided by a guide groove in a chassis of the apparatus and then introducing the drawn magnetic tape onto the magnetic head drum;
   (d) first and second links each connected at opposite ends to a respective one of said loading disks and said tape drawing member, respectively, for converting the rotation of the respective loading disk to the drawing movement of said tape drawing member, said first link being connected to one of said loading disk for moving said tape drawing member, said second link being connected to the other loading disk for angularly moving a pinch arm; and
   (e) driving means for giving a rotating force to said loading disks.

18. A magnetic recording and reproducing apparatus according to claim 17, in which at least one of said loading disks has in its outer peripheral edge a tooth-free portion such that the amount of the drawing movement of said tape drawing member or the amount of movement of a pinch roller to a predetermined value.

* * * * *